United States Patent [19]
Talbott et al.

[11] Patent Number: 5,640,007
[45] Date of Patent: Jun. 17, 1997

[54] OPTICAL ENCODER COMPRISING A PLURALITY OF ENCODER WHEELS

[75] Inventors: Kenneth R. Talbott, Gretna; Charles L. Hylton, Madison Heights; James A. Austin; William C. Hooss, both of Lynchburg; David V. Adams, IV, Gretna; Kevin G. Schulz, Forest; Paul R. Smith, Jr., Lynchburg, all of Va.

[73] Assignee: Limitorque Corporation, Lynchburg, Va.

[21] Appl. No.: 493,271

[22] Filed: Jun. 21, 1995

[51] Int. Cl.$^6$ .................................................. G01D 5/347
[52] U.S. Cl. ............................. 250/231.15; 250/231.18
[58] Field of Search .......................... 250/321.15, 231.18, 250/231.1, 231.13, 231.14, 231.17, 229, 239, 237 G

[56] References Cited

U.S. PATENT DOCUMENTS

| | | | |
|---|---|---|---|
| 3,808,431 | 4/1974 | Hedrick | 250/231.18 |
| 3,989,943 | 11/1976 | Campbell et al. | 250/231.15 |
| 4,031,386 | 6/1977 | Recker | 250/231.18 |
| 4,056,850 | 11/1977 | Brown . | |
| 4,123,750 | 10/1978 | Leney et al. . | |
| 4,376,161 | 3/1983 | Volpe . | |
| 4,377,744 | 3/1983 | Mocenter et al. | 250/231.18 |
| 4,621,256 | 11/1986 | Rusk | 250/231.18 |
| 4,631,520 | 12/1986 | Wingate . | |
| 4,740,690 | 4/1988 | Mosier | 250/231.18 |
| 4,819,051 | 4/1989 | Jacobson . | |
| 4,904,861 | 2/1990 | Epstein et al. . | |
| 4,947,166 | 8/1990 | Wingate et al. . | |
| 4,952,799 | 8/1990 | Loewen . | |
| 4,998,013 | 3/1991 | Epstein et al. . | |
| 5,062,214 | 11/1991 | Gustafsson et al. . | |
| 5,088,061 | 2/1992 | Golnabi et al. . | |
| 5,148,020 | 9/1992 | Machida . | |
| 5,252,824 | 10/1993 | Picanyol | 250/231.18 |
| 5,276,722 | 1/1994 | Aoki et al. . | |
| 5,402,275 | 3/1995 | Nishido . | |
| 5,402,365 | 3/1995 | Kozikaro et al. . | |
| 5,402,445 | 3/1995 | Matsuura . | |

FOREIGN PATENT DOCUMENTS 2196494  1/1991  United Kingdom .

*Primary Examiner*—Edward P. Westin
*Assistant Examiner*—John R. Lee
*Attorney, Agent, or Firm*—Paul & Paul

[57] ABSTRACT

An absolute encoder monitors rotary position and senses rotary displacement relative to a measuring scale. The absolute encoder evaluates rotary displacement by providing a plurality of rotatably mounted encoder wheels, and each wheel includes at least one code sequence which in combination comprises the measuring scale. A pinion is provided between each pair of encoder wheels in order that each of the encoder wheels will be rotated upon the rotation of the shaft. Each code sequence of the encoder wheel is monitored by a sensing mechanism and this information is utilized to evaluate the shaft position. The sensing mechanism includes both light emitting and light detecting devices which monitor a defined region of each code sequence and this is evaluated in determining the rotary position.

34 Claims, 18 Drawing Sheets

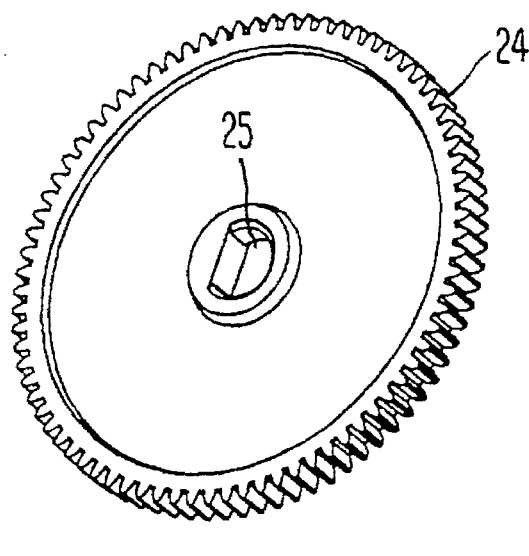
_Fig. 3_
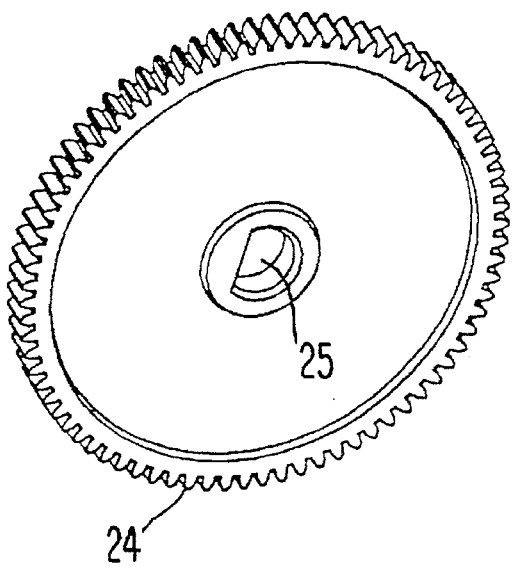
_Fig. 4_
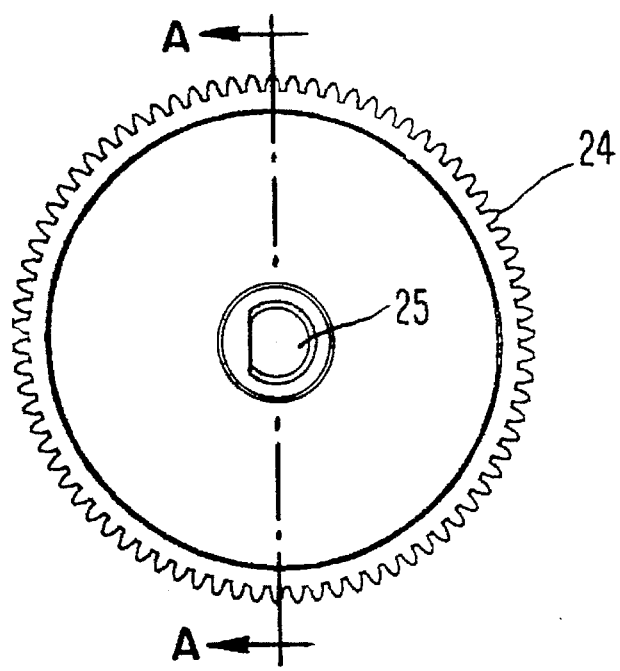
_Fig. 5_

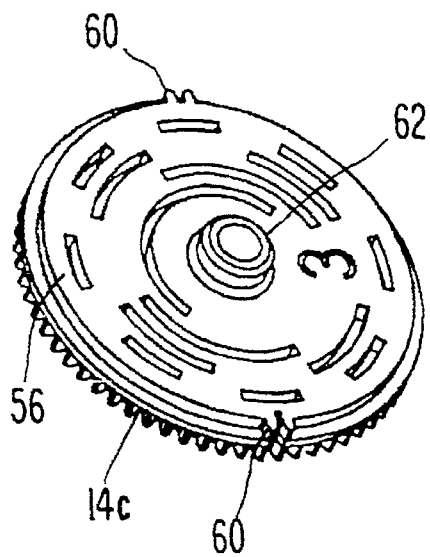
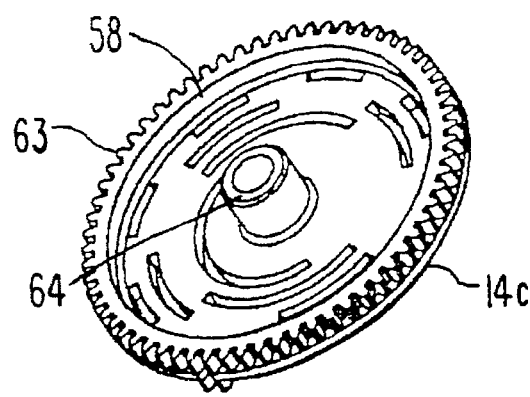
*Fig. 17*  *Fig. 18*
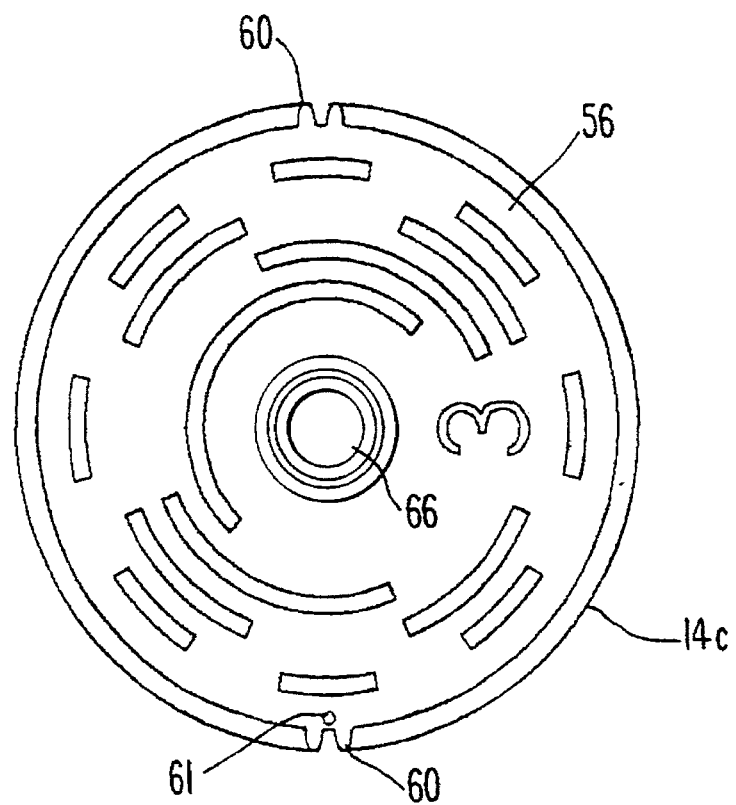
*Fig. 19*

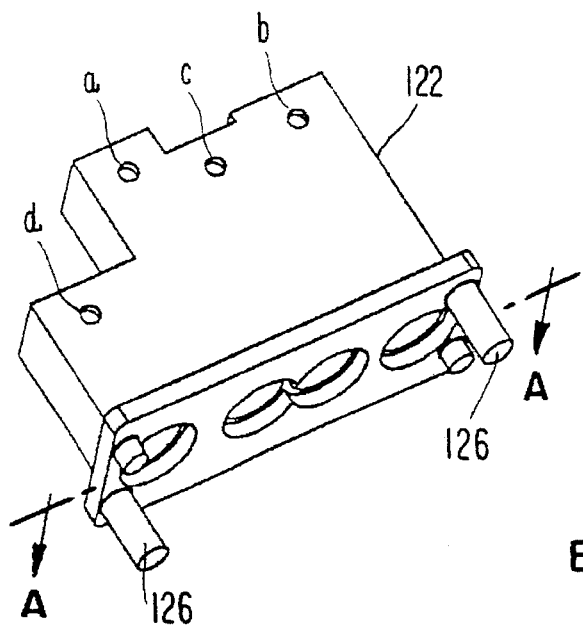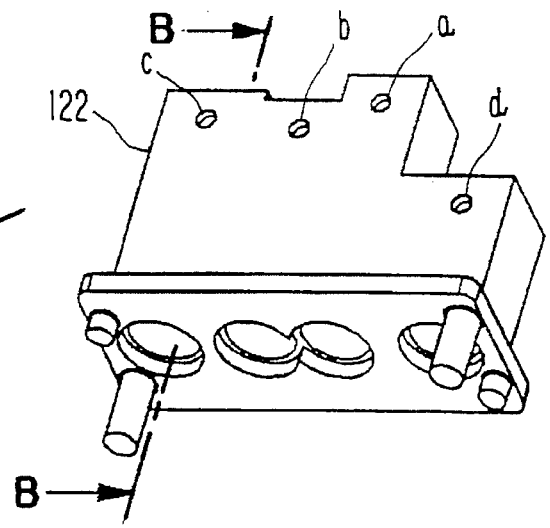
*Fig. 35*  *Fig. 36*
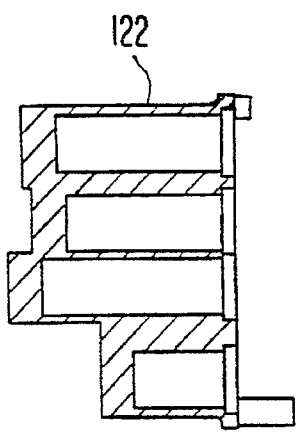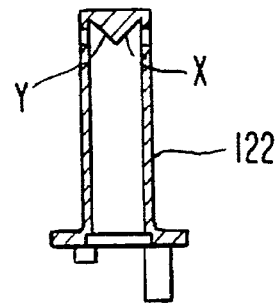
*Fig. 37*  *Fig. 38*

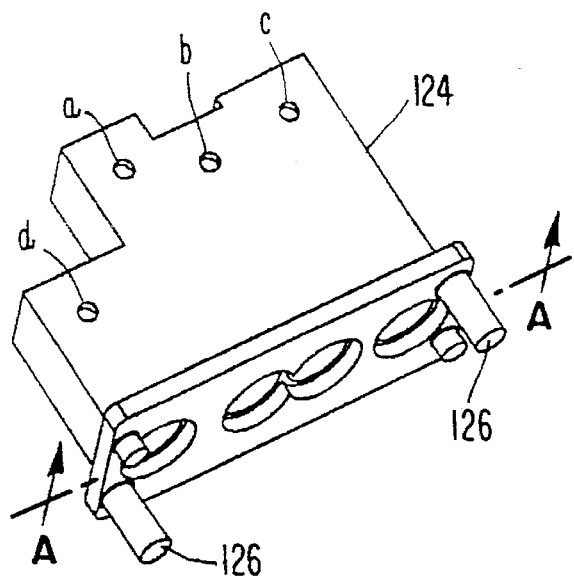
_Fig. 39_
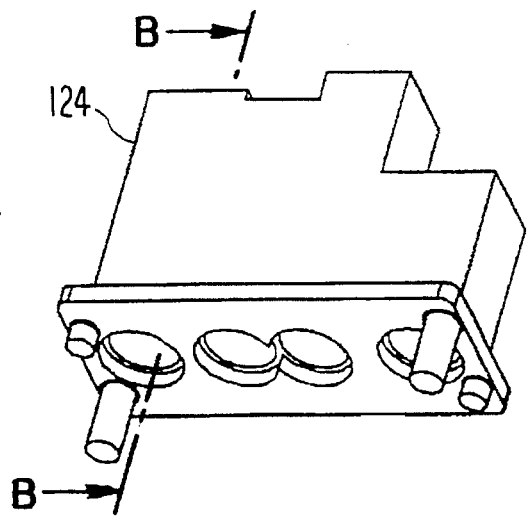
_Fig. 40_
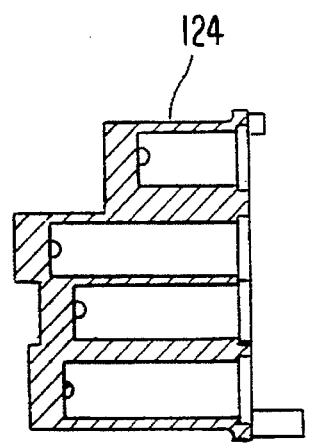
_Fig. 41_
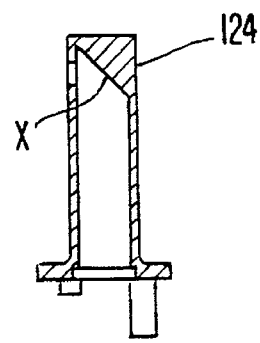
_Fig. 42_

OPTICAL ENCODER COMPRISING A PLURALITY OF ENCODER WHEELS

BACKGROUND OF THE INVENTION

1. Field of the Invention

The present invention relates generally to rotary position sensors, and more particularly to encoders which provide digital representation of angular position.

2. Description of the Prior Art

In many applications it is necessary to identify the positioning of a rotary member, for example, one such type of application is a rotary actuator, such as a valve actuator, which in operation must be able to accurately sense the position of the output shaft. Traditionally, position sensing of a rotary member has been accomplished through use of cam operated switches and/or potentiometers. Absolute encoders are also known which provide a digital representation corresponding to the rotary position. Absolute encoders utilize a sensing mechanism which evaluates rotary displacement relative to a measuring scale. For sensing rotary displacement, the scale is in the form of one or more disks that rotate a plurality of concentric tracks providing respective bits of a multi-bit digital code. The code tracks are typically formed of optically responsive segments which are etched, painted, drilled, or otherwise modified on the rotating disk. Advantageously, absolute encoders have the property that the operating power can be removed without loss of the data corresponding to rotary position since the data is carried by the encoder itself. However, in providing these functions, absolute encoders require a great many parallel scales, the exact number depending upon the range and accuracy requirements. This large number of scales required in absolute encoders causes them to be more delicate in application as well as less reliable. However, in many applications, the reliability and ruggedness are extremely important features. Furthermore, the cost of the typical absolute encoder is rather high for these same reasons. Accordingly, the present invention has been developed in view of the foregoing and to overcome the deficiencies of the prior art.

SUMMARY OF THE INVENTION

The present invention provides an absolute encoder of improved accuracy and low cost not found in the prior art. The absolute encoder of the present invention includes a plurality of rotatably mounted encoder wheels. Each encoder wheel includes at least one code sequence extending concentrically around the encoder wheel. The absolute encoder of the present invention also includes means provided between each pair of encoder wheels which operates to rotate the second encoder wheel of the pair a predetermined amount following a predetermined amount of rotation of the first encoder wheel of the pair. Sensing means are also included which comprise light emitting means and detector means. The light emitting means is adapted to illuminate a defined region of the code sequence. The detector means is adapted to identify light which is illuminated by the light emitting means relative to the defined region of the code sequence.

It is an object of the present invention to provide a sensor which can accurately determine the position of a rotatable shaft.

Another object of the present invention is to provide a novel encoder which is of improved accuracy and reliability, and which can be provided at low cost.

Still another object of the present invention is to provide an improved absolute encoder capable of accurately sensing displacement of a rotary shaft and which is inexpensive to manufacture and assemble.

These and other objects of the present invention will become more readily apparent when taken into consideration with the following description and attached drawings.

BRIEF DESCRIPTION OF THE DRAWINGS

FIGS. 3 and 4 are top plan and bottom plan perspective views of an input gear of FIG. 1;

FIG. 5 is a top plan view of the input gear of FIG. 3;

FIGS. 17 and 18 are top plan and bottom plan perspective views of a third encoder wheel of FIG. 1;

FIG. 19 is a top plan view of the third encoder wheel of FIG. 17;

FIGS. 35 and 36 are top plan and bottom plan perspective views of a middle tower of a tower assembly of FIG. 1;

FIG. 37 is a sectional top plan view of the middle tower of FIG. 35 taken along the line A—A;

FIG. 38 is a side sectional view of the middle tower of FIG. 36 taken along the line B—B;

FIGS. 39 and 40 are top plan and bottom plan perspective views of a top tower of a tower assembly of FIG. 1;

FIG. 41 is a sectional top plan view of the top tower of FIG. 39 taken along the line A—A;

FIG. 42 is a side sectional view of the top tower of FIG. 40 taken along the line B—B;

DETAILED DESCRIPTION OF THE PREFERRED EMBODIMENTS

Figure 1:
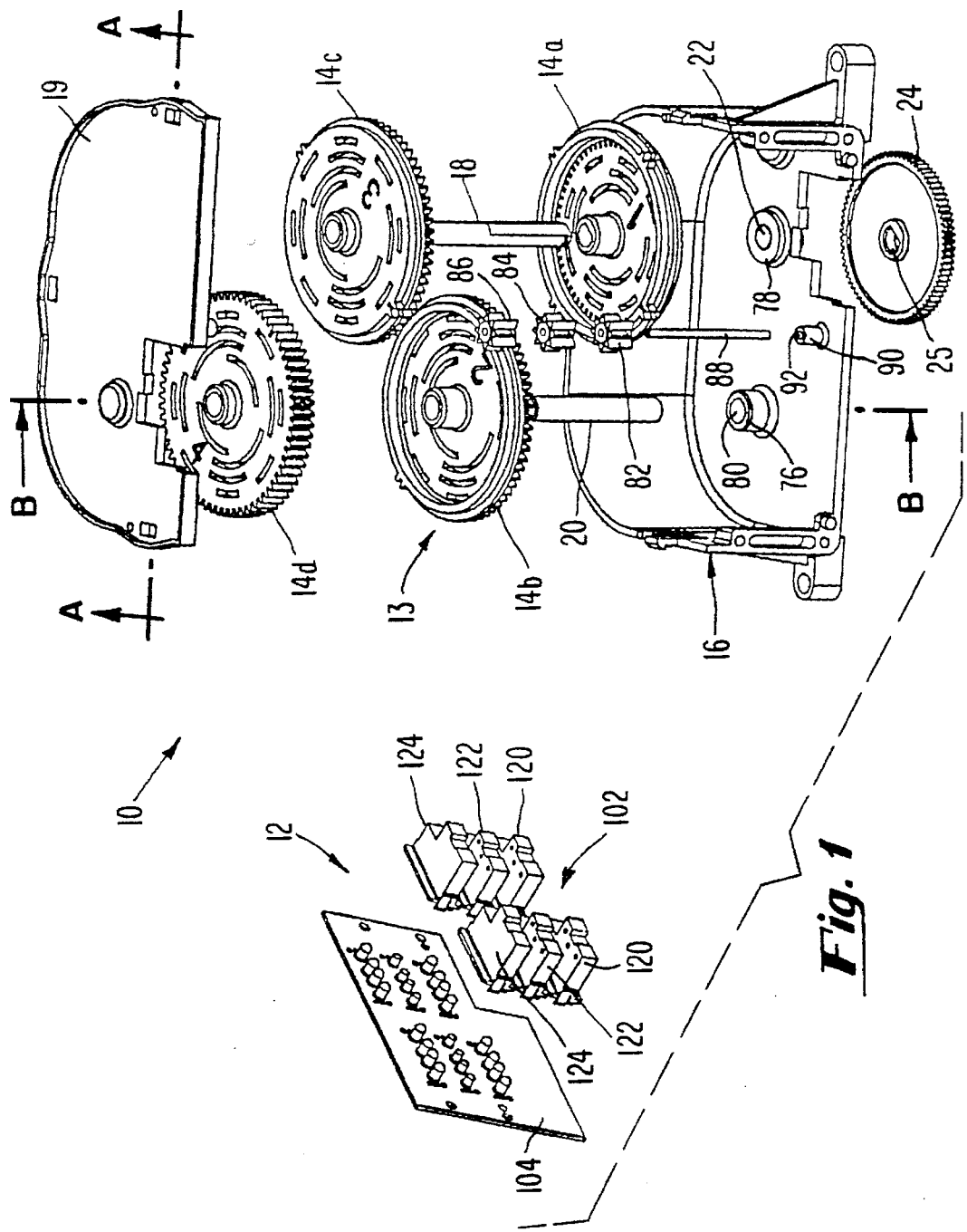
FIG. 1 is an exploded perspective view illustrating an embodiment of the absolute encoder of the present invention.

Referring now to the drawings in detail, wherein like reference numerals indicate the like elements throughout the several views, there is shown in FIG. 1 an exploded perspective view of an absolute encoder 10 according with an embodiment of the present invention. The principal components of the absolute encoder 10 are a sensing means which is identified by the numeral 12 and an encoder wheel assembly 13, with each of these components being provided within a housing 16.

The encoder wheel assembly 13 in accordance with the present invention comprises a plurality of encoder wheels, which in the present embodiment a total of four encoder wheels are provided, and these are identified in FIG. 1 by the numbers 14a–d. The first and third encoder wheels 14a and c, respectively, are mounted on a first shaft 18 and the second and fourth encoder wheels 14b and d, respectively, are mounted on a second shaft 20. The first shaft 18 in turn extends out through an opening 22 through the housing 16 which is connected with an input gear 24.

Preferably, in this embodiment the first and second shafts 18 and 20 are comprised of stainless steel. The input gear 24 as best seen in FIGS. 3–6, is a substantially circular shaped disk member preferably molded of plastic, such as Hoechst Celanese resin, celron M270, and includes a plurality of spaced teeth on its peripheral surface. The input gear 24 also includes an aperture 25 which is generally in the shape of a "D" which receives a corresponding D-shaped portion of the first shaft 18 for connection. Although not shown, the input gear 24 is provided in connection with a drive shaft, which includes proximate its upper end a plurality of teeth on its peripheral surface for engaging the teeth of the input gear 24. The drive shaft is in turn connected with or made a part of a rotary member (not shown) which is to be monitored by the absolute encoder 10. As indicated earlier, the present invention is adapted to be used in types of applications where a rotary member is desired to be monitored with respect to its angular position, for example, an output shaft of a rotary actuator such as a valve actuator. As to the configuration of the encoder wheels 14a–14d, each are substantially circular shaped disk members which are preferably injection molded of thermoplastic or thermosetting materials, such as Hoechst Celanese resin, celcon M270, however, other manufacturing techniques and other materials can also be utilized for the same purpose. In accordance with the present invention, each of the encoder wheels 14a–14d are provided with at least one code sequence extending concentrically around the encoder wheel. In this embodiment, as illustrated in the figs., each encoder wheel 14a–14d includes a series of four code sequences around the encoder wheel. For illustration purposes, the four code sequences in relation to the four encoder wheels 14a–d are identified by the letters a-d in FIGS. 10, 15, 20 and 25. The function and operation of the code sequences will be described in more detail below.

Figure 9:
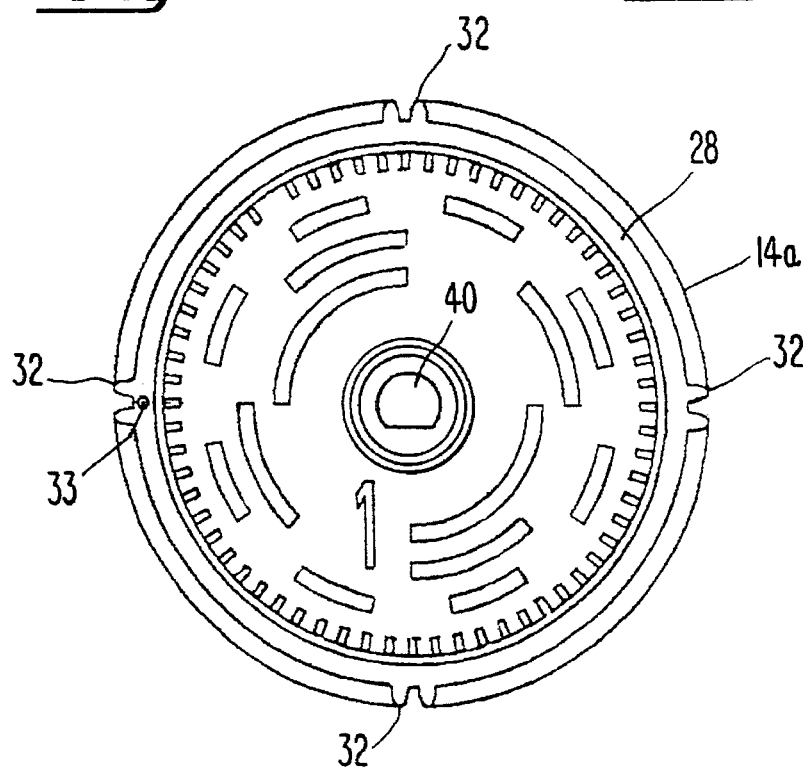
FIG. 9 is a top plan view of the first encoder wheel of FIG. 7.

As best illustrated in FIGS. 7–11, the first encoder wheel 14a includes on its circumferential surface an upper flange 28 and a lower flange 30, with the lower flange 30 extending generally radially outward and the upper flange surface 28 extending generally perpendicularly upward proximate the lower flange 30. Further, the upper flange surface 28 includes extending generally radially outward therefrom four pairs of teeth 32 at spaced separation. In the present embodiment, each of the four pairs of teeth 32 are spaced at 90° intervals around the circumference of the wheel 14a. Further, the two teeth which comprise the four pairs 32 are positioned adjacent the other as best shown in FIG. 9. In addition, the first encoder wheel 14a is included with a cavity within its upper surface and a substantially annular ring member 36 is provided which extends outwardly from the upper surface proximate the center of the encoder wheel 14a. Similarly, a second substantially annular ring member 38 extends from the bottom surface, although a distance less than that associated with the annular ring member 36. In addition, a substantially cylindrical cavity defining a timing mark 33 is also included within the upper flange 28 proximate and between one of the four pairs of teeth 32. As indicated earlier, the first encoder wheel 14a is mounted to the first shaft 18 and for this purpose an aperture 40 is formed extending through the first encoder wheel 14a through each of the annular ring members 36 and 38. In accordance with the present invention, the first encoder wheel 14a is adapted to be rotatable with the first shaft 18, and for this purpose in this embodiment the aperture 40 extending through the first encoder wheel 14a is generally in the shape of a "D" which receives the correspondingly D-shaped portion of the first shaft 18. In this manner, the first encoder wheel 14a will be fixed for rotation with the first shaft 18.

The second encoder wheel 14b as shown in FIGS. 12–16 similar to the first encoder wheel 14a also includes two flanges extending around the periphery of the wheel which are identified by the numerals 44 and 46. The top flange 44 is also included with a pair of teeth extending radially from its outer surface which is shown at 45. In this embodiment, two pairs of teeth 45 are shown which are spaced at 180° intervals. However, contrary to the first encoder wheel 14a, the lower flange 46 includes a plurality of teeth 47 at its outer surface which extend around the circumference of the encoder wheel 14b. Generally, the spacing between each of the individual teeth 47 on the lower flange 46 is the same as that between the two teeth comprising the pair 45. Further, a substantially cylindrical aperture 49 defining a timing mark is provided within the top flange 44 of the second encoder wheel 14b proximate and between one of the two pairs of teeth 45. In addition, a cavity is included within the upper surface of the second encoder wheel 14b and two substantially annular ring members 48 and 50 are also provided extending outward from the upper and bottom surfaces, respectively, similar to that shown in relation to the first encoder wheel 14a. However, contrary to that in relation to the first encoder wheel 14a, the second encoder wheel 14b is included with an aperture 52 extending therethrough, which is substantially cylindrical in configuration and this receives a substantially cylindrical portion of the second shaft 20. This relationship between the substantially cylindrical aperture 52 and second shaft 20 is such that the rotation of the second encoder wheel 14b is independent of the second shaft 20.

The third encoder wheel 14c as illustrated in FIGS. 17–21 similar to the first two encoder wheels also includes upper and lower flanges around the circumference identified by 56 and 58. Similar to the second encoder wheel 14b, the upper flange 56 includes two pairs of teeth 60 spaced at 180° apart. In addition, a substantially cylindrical aperture 61 defining a timing mark 61 is provided proximate and between one of the two pairs of teeth 60 within the upper flange 56 of the third encoder wheel 14c. Further, the lower flange 58 is provided with a plurality of spaced teeth 63 surrounding the periphery thereof. Also, two substantially annular ring members 62 and 64 are shown extending proximate the center from the upper and lower surfaces of the third encoder wheel 14c, respectively. However, it is noted that the annular ring member 64 extends outward from the lower surface of the third encoder wheel 14c a distance which is greater than that of the annular ring member 62. Further, similar to the second encoder wheel 14b, a substantially cylindrical aperture 66 is provided through each annular ring member 62 and 64 through the third encoder wheel 14c. Also, the substantially cylindrical aperture 66 is received onto a substantially cylindrical portion of the first shaft 18, and this configuration provides that the rotation of the third encoder wheel 14c is independent of the first shaft 18, similar to that with relation to the second encoder wheel 14b on the second shaft 20. However, contrary to that shown in relation to the first and second encoder wheels, the lower surface of the encoder wheel 14c is provided with a cavity therein and the upper surface is substantial planar.

The fourth encoder wheel as shown in FIGS. 22–26 is identified by the numeral 14d and is different from that shown in relation to the first three encoder wheels since two separate flanges are not provided. Rather, as best shown in the FIGS. 22 and 23, the radius of the fourth encoder wheel 14d is substantially constant around the circumference thereof. Also, similar to the third encoder wheel 14c, the upper surface is substantially planar and a cavity is provided within the bottom surface. Further, similar to the third encoder wheel 14c, the fourth encoder wheel 14d includes upper and lower substantially annular ring members 68 and 70, respectively, with the lower ring member 70 extending outwardly a distance greater than that of the upper annular ring member 68. Also, a substantially cylindrical aperture 72 extends through each of the annular ring members 68 and 70 through the wheel, and this is engaged by the second shaft 20 in a manner similar to the second and third encoder wheels. Another difference in the fourth encoder wheel 14d is that extending outward from the periphery thereof are a plurality of teeth 74 at spaced separation which extend completely around the circumference. Generally, the spacing between each tooth 74 is similar to that in relation to the teeth of the lower flanges 64 and 46 in relation to the third and second encoder wheels, although the width of the teeth 74 of the fourth encoder wheel 14d are greater than the other two wheel members. Similar to the third encoder wheel 14c, a substantially cylindrical cavity 71 defining a timing mark is provided within the upper surface proximate and between two of the plurality of teeth 74 extending around the circumference.

Figure 2A:
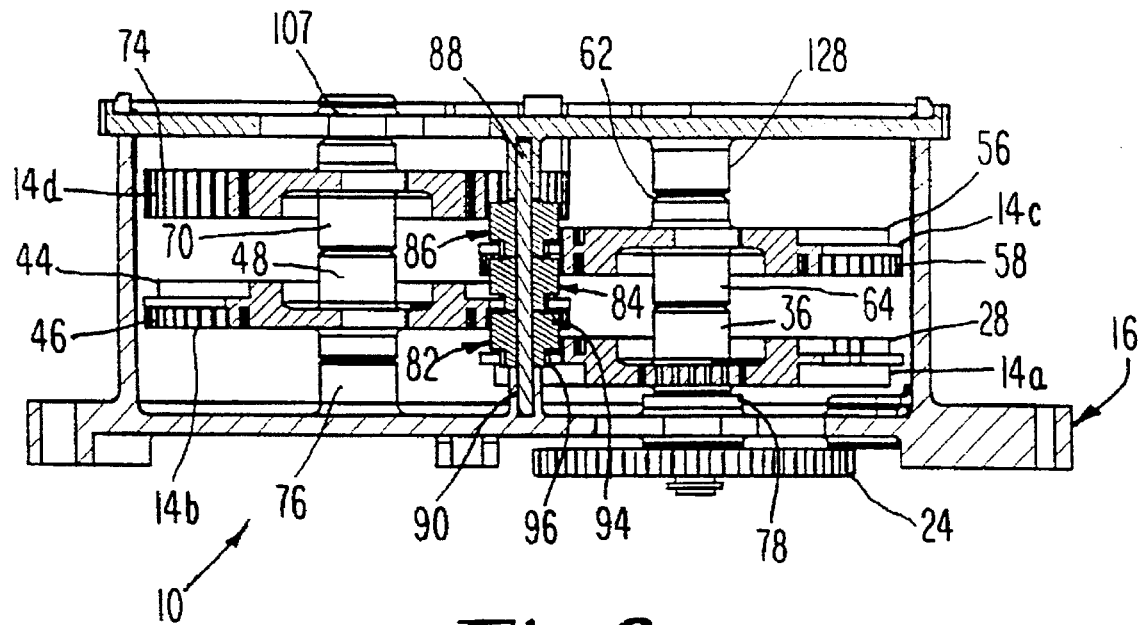
FIG. 2a is a sectional front elevational view of the absolute encoder illustrated in FIG. 1; taken along the line A—A and showing an encoder wheel assembly.

As indicated earlier, the four encoder wheels are contained in the housing 16. The housing 16 as illustrated in FIG. 1 can be manufactured by conventional techniques, such as injection molding and of conventional materials, such as General Electric resin, xenoy 6620. As illustrated in FIG. 1, two substantially annular seating members 76 and 78 are formed extending from the inner surface of the bottom of the housing 16, which are adapted to receive the second encoder wheel 14b and first encoder wheel 14a, respectively. Generally, the first annular seating member 76 extends outward from the inner surface of the housing 16 a distance greater than that of the annular seating member 78. In this manner, when the second encoder wheel is seated in the housing, the position of the second encoder wheel 14b is offset relative to the position of the first encoder wheel 14a, which is seated on the annular seating member 78. The annular seating member 76 also is provided with a substantially cylindrical cavity 80 within its upper surface in order to receive the second shaft 20, which supports the position of the second encoder wheel 14b and fourth encoder wheel 14d in housing 16. As indicated earlier, the first shaft 18 extends out through the aperture 22 in the housing 16 and this engages the input gear 24, which supports the position of the first encoder wheel 14a and third encoder wheel 14c in housing 16. Similar to the offset position of the second encoder wheel 14b and first encoder wheel 14a, the fourth encoder wheel 14d is also offset in relation to the third encoder wheel 14c. In particular, on assembly as shown in FIG. 2a, the annular ring member 64 of the third encoder wheel 14c seats against the annular ring member 36 of the first encoder wheel 14a. Similarly, the annular ring member 70 of the fourth encoder wheel 14d is seated against the annular ring member 48 of the second encoder wheel 14b.

In accordance with this embodiment, encoder wheels 14b, 14c and 14d are rotatable relative to the rotational movements of the input gear 24 through its connection with the drive shaft, which causes corresponding rotatable movement of the first encoder wheel 14a. For this purpose, there are means provided between the encoder wheels in order to provide rotation of each of the wheels. In this exemplary embodiment, as illustrated in FIGS. 1 and 2, there are three pinions 82, 84 and 86 provided which interconnect each adjacent pair of encoder wheels. Specifically, the pinion 82 is positioned between the first encoder wheel 14a and the second encoder wheel 14b, the second pinion 84 is positioned between the second encoder wheel 14b and the third encoder wheel 14c, and the third pinion 86 is positioned between the third encoder wheel 14c and the fourth encoder wheel 14d. This particular position of the three pinions 82, 84 and 86 is supported by a pinion shaft 88 which is positioned within the housing 16. As to the composition of the three pinions, each are preferably injected molded of thermoplastic or thermosetting materials, for examples, Hoechst Celanese resin, celcon M270, however other techniques or materials could be used. Also, the pinion shaft 88 is preferably comprised of stainless steel. Similar to the annular seating member 76, an annular seating member 90 is also provided within the inner surface of the bottom of the housing 16 which works to seat the first pinion 82 in an offset position. Further, the annular seating member 90 is also included with a substantially cylindrical cavity 92 within its upper surface for receiving the shaft 88. As to the configuration of the pinions 82, 84 and 86, each are the same, and for illustration purposes the portions are described in relation to the pinion 82 shown in FIGS. 27–30. Pinion 82 as shown is a generally elongated member which includes a series of long teeth 94 and short teeth 96 extending circumferentially around the outer surface. In this embodiment, the position of the long teeth 94 and short teeth 96 are alternating, with there being four long teeth 94 spaced at 90° intervals and four short teeth 96 also spaced at 90° intervals, which results with a spacing of 45° between each respective long tooth 94 and short tooth 96. Further, a substantially cylindrical aperture 98 is provided extending through the pinion 82 which connects with the pinion shaft 88 for rotatable movement. Additionally, similar to the first, second and third encoder wheels 14a, 14b and 14c, the rotation of each of the pinions 82, 84 and 86 are independent of one another on the shaft. In particular, on assembly, as best shown in FIGS. 1 and 2, the first pinion 82 is positioned so that the short teeth 96 are adjacent the upper flange 28 of the first encoder wheel 14a and will engage the pairs of teeth 32 upon rotation of the first encoder wheel 14a. The long teeth 94 of the first pinion 82 are positioned to be engaged with the teeth 47 of the lower flange 46 of the second encoder wheel 14b. Similarly, the second pinion 84 is positioned so that the short teeth are adjacent the upper flange 44 of the second encoder wheel 14b for engagement by the pair of teeth 45 upon rotation, and the long teeth are in engagement with the teeth 63 of the lower flange 58 of the third encoder wheel 14c. Finally, the third pinion 86 is positioned with its short teeth in engagement with the upper flange 56 of the third encoder wheel 14c for engagement by the pairs of teeth 60 upon rotation, and the long teeth are in engagement with the teeth 74 of the fourth encoder wheel 14d. The operation of the encoder wheel assembly 13 defined by the four encoder wheels and the three pinions will be described in more detail hereafter.

As indicated earlier, each of the four encoder wheels in this embodiment includes a series of four code sequences extending concentrically around each wheel. Generally, these code sequences provide the information which is evaluated to determine the shaft position. Specifically, defined regions of each code sequence are evaluated which provides the necessary information as to the relative position of the shaft. In accordance with this invention, the sensing means 12 is provided which monitors the defined regions of each of the respective code sequences as will be described below. In the present embodiment, the code sequences are formed of slots of various lengths and provided at various spaced intervals which extend through the encoder wheels. The sensing means 12 operates by monitoring the defined region of each of the four code sequences on each of the encoder wheels, which is a total of 16 different defined regions. In this manner, the present invention evaluates the rotary position by monitoring any of the changes in the information detected at each of the defined regions. In the present invention, the data monitored by the sensing means 12 corresponding to each defined region is represented by one bit, with the total number of bits from the four encoder wheels comprising a 16 bit integer value. In the present embodiment, the code sequences are arranged so that the digital representation of the rotary position corresponds to grey code in that only one bit of the 16 bit integer value changes corresponding to each incremental change in rotary position. An advantage of the grey code representation which provides only a single bit change at any given time is that any errors in the determination of the rotary position can be easily detected. Further, any problems in count due to timing errors, such as delay associated with the sensing means, are substantially reduced or eliminated. For example, since only one bit of the integer value changes, there is no need for the sensing means 12 to monitor more than one bit change of information at a time, and accordingly process that information. Further, the detection of rotary position is independent of the direction of rotation of the rotary member and a single bit change will correspond with either clockwise or counterclockwise rotation of the encoder 10.

Figure 10:
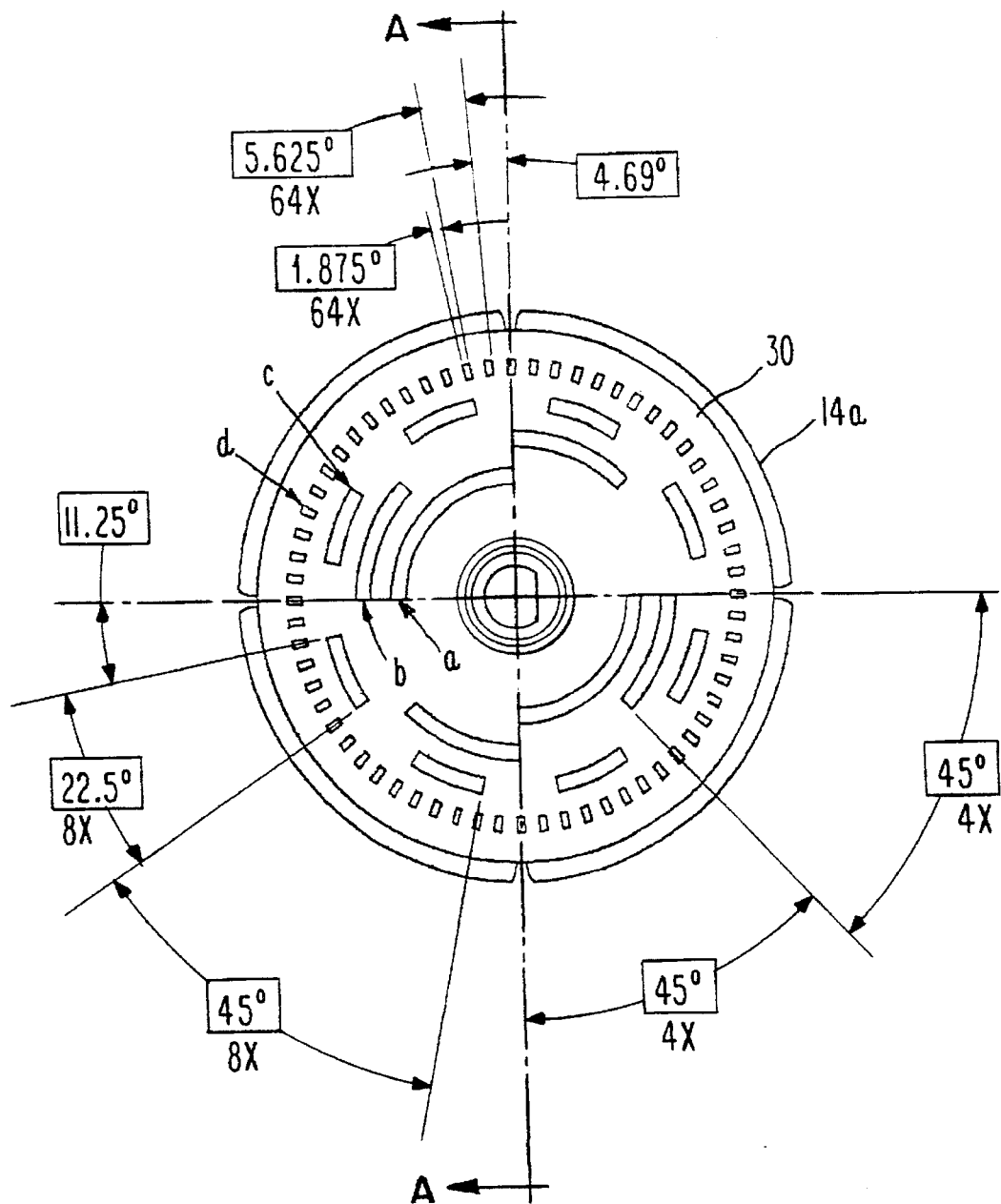
FIG. 10 is a bottom plan view of the first encoder wheel of FIG. 8.
Figure 11:
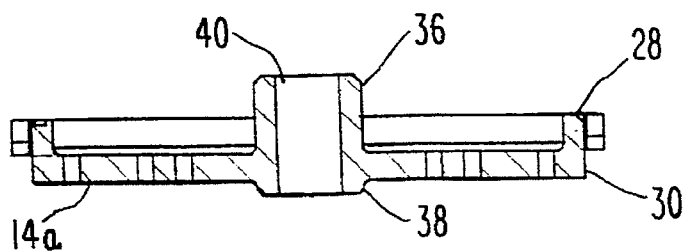
FIG. 11 is a sectional elevational view of the first encoder wheel of FIG. 10 taken along the line A—A.
Figure 12:
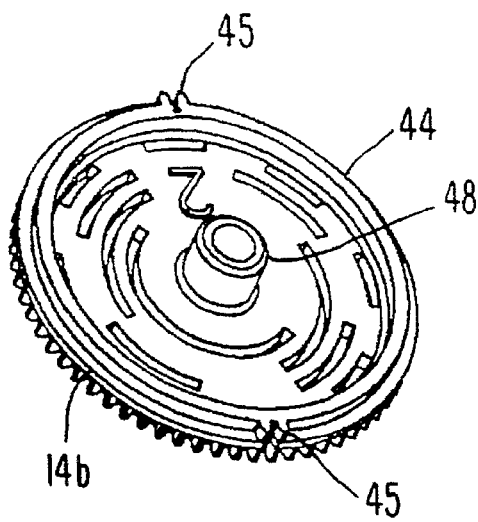
FIGS. 12 and 13 are top plan and bottom plan perspective views of a second encoder wheel of FIG. 1.
Figure 13:
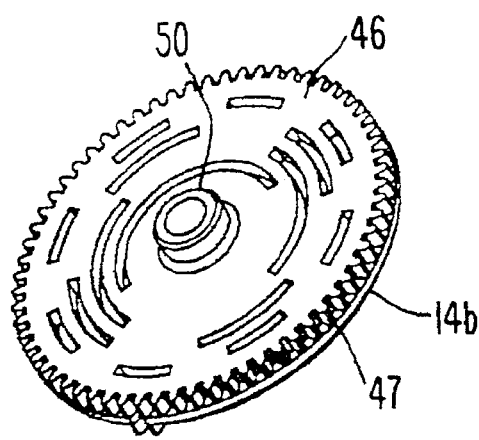
Figure 14:
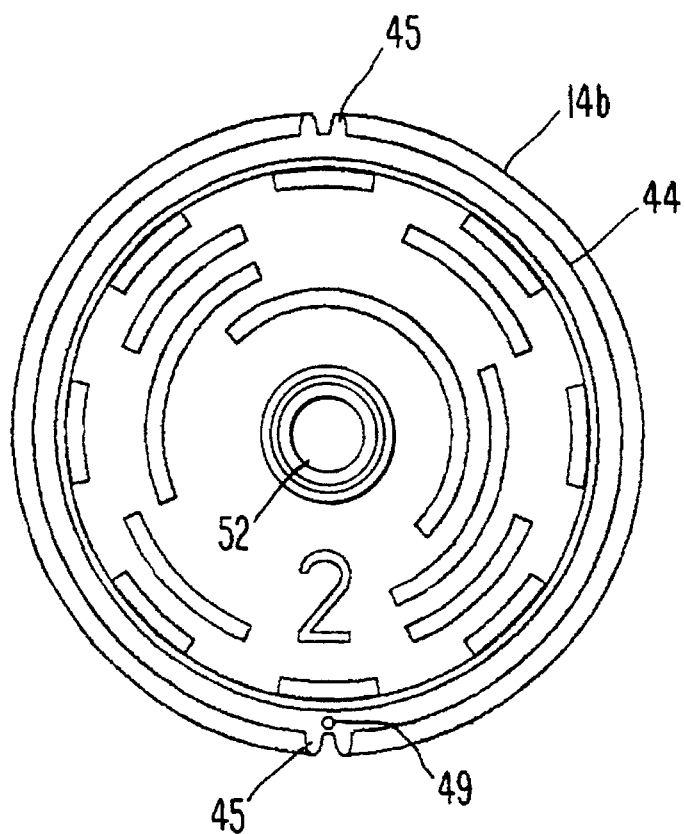
FIG. 14 is a top plan view of the second encoder wheel of FIG. 12.
Figure 15:
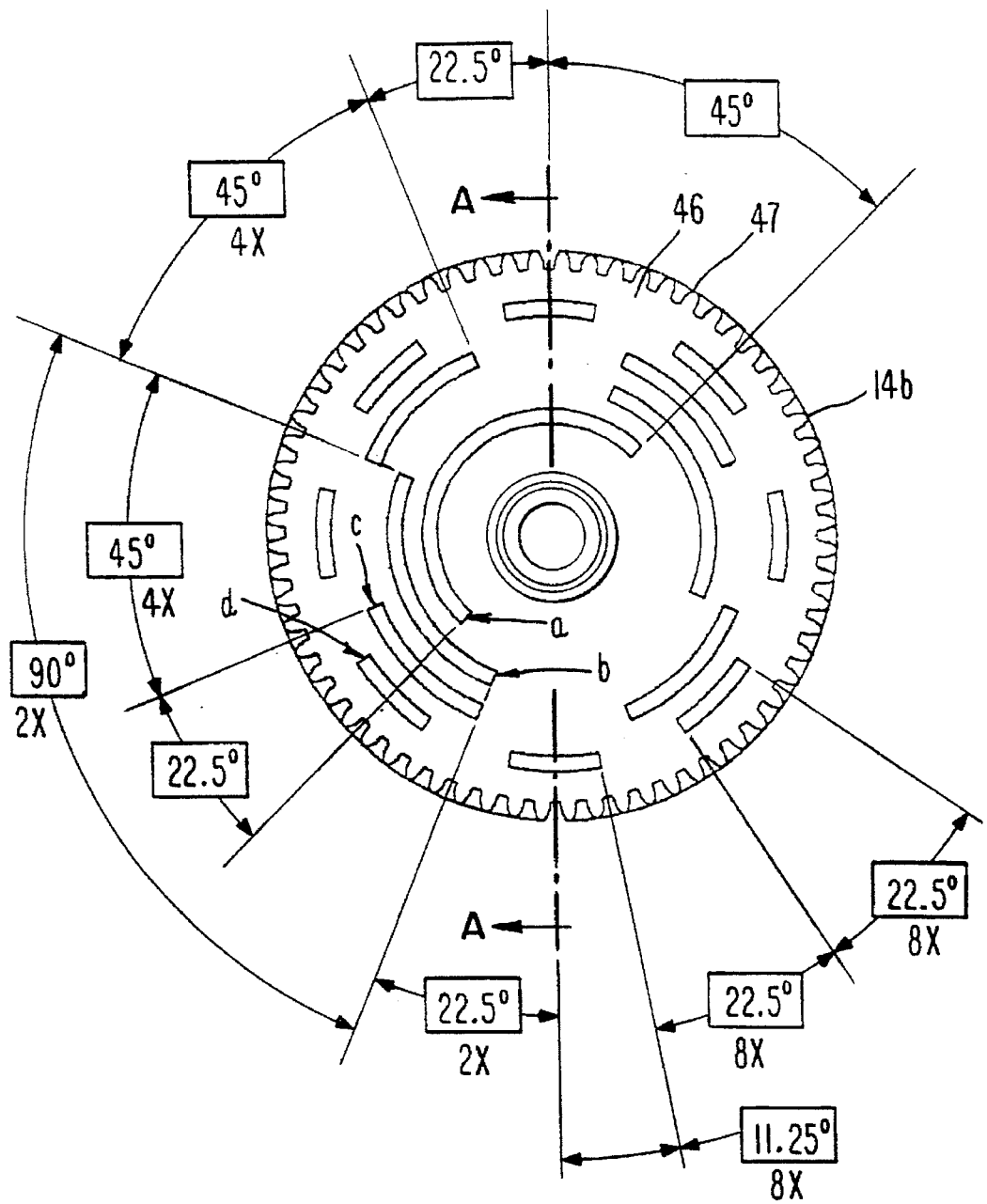
FIG. 15 is a bottom plan view of the second encoder wheel of FIG. 13.
Figure 16:
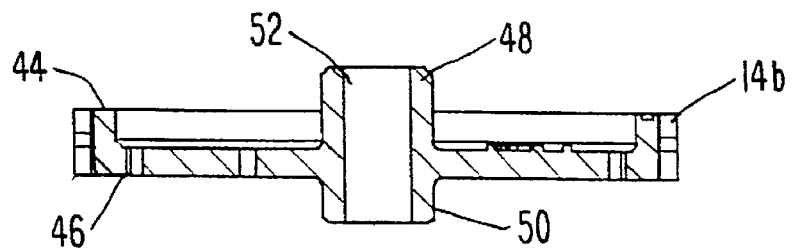
FIG. 16 is a sectional elevational view of the second encoder wheel of FIG. 15 taken along the line A—A.
Figure 20:
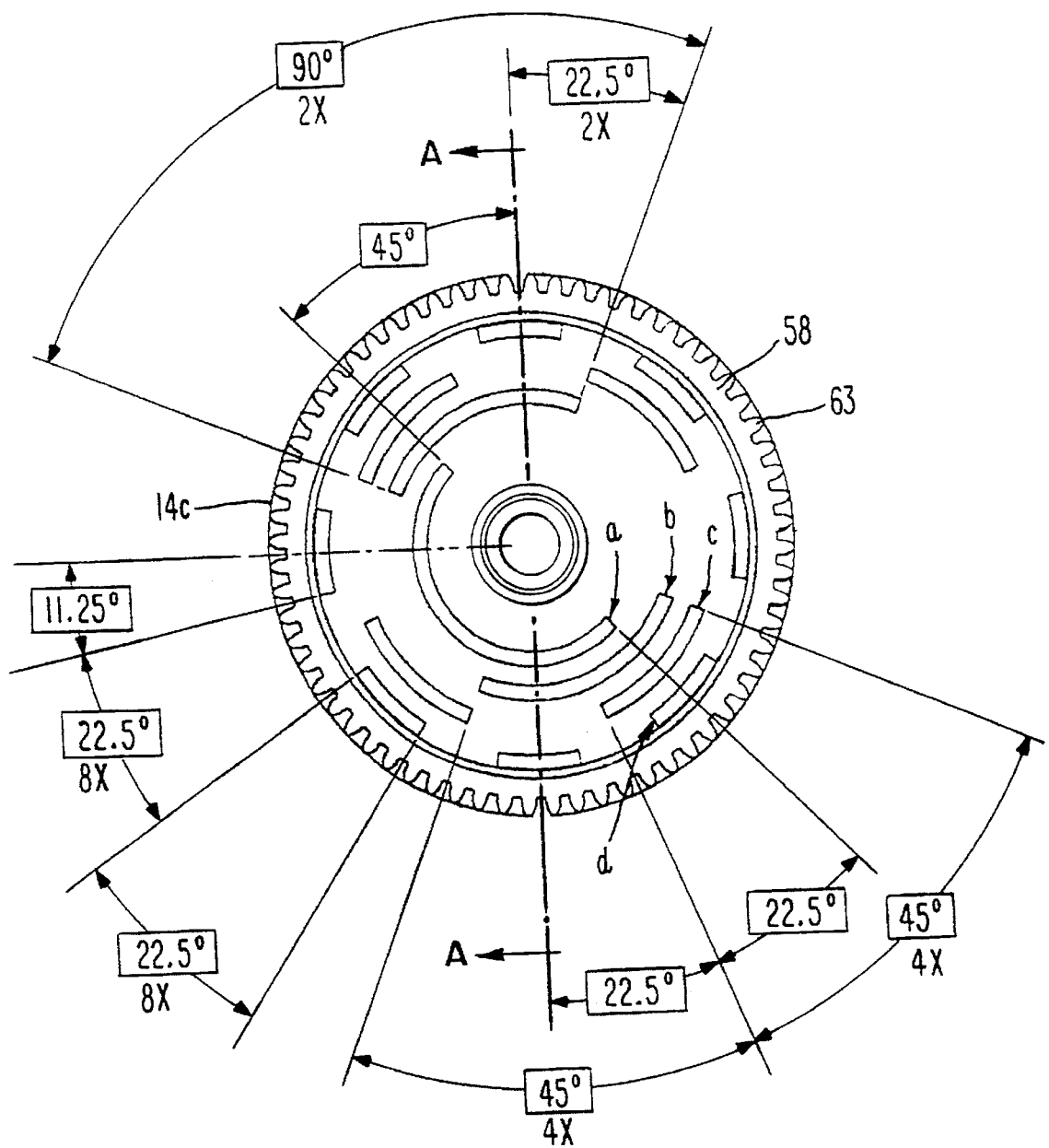
FIG. 20 is a bottom plan view of the third encoder wheel of FIG. 18.
Figure 21:
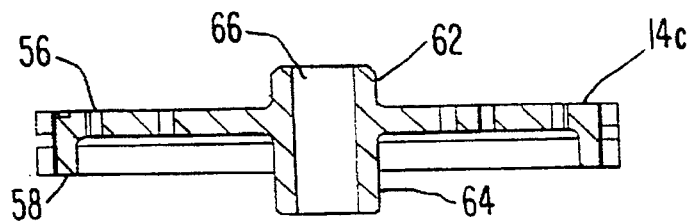
FIG. 21 is a sectional elevational view of the third encoder wheel of FIG. 20 taken along the line A—A.
Figure 22:
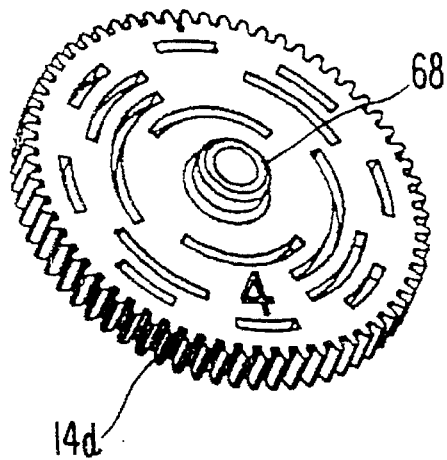
FIGS. 22 and 23 are top plan and bottom plan perspective views of a fourth encoder wheel of FIG. 1.
Figure 23:
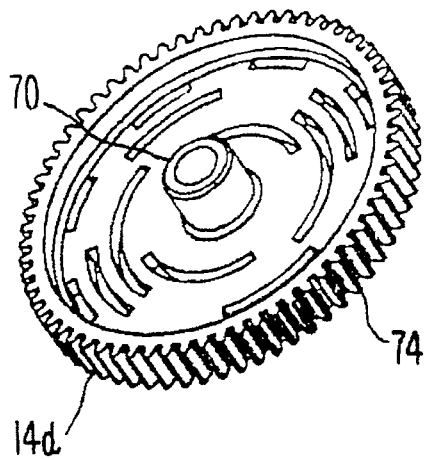
Figure 24:
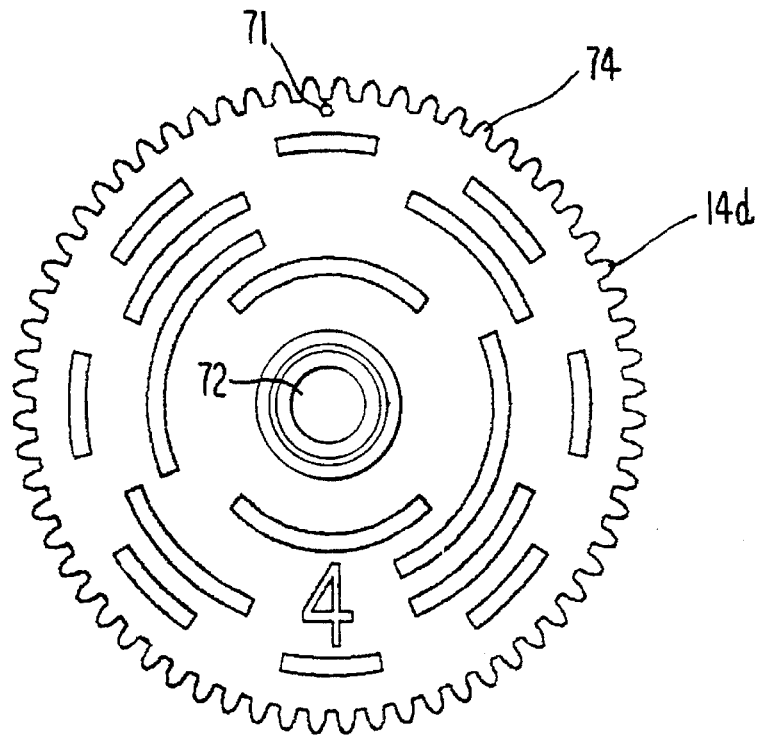
FIG. 24 is a top plan view of the fourth encoder wheel of FIG. 22.
Figure 25:
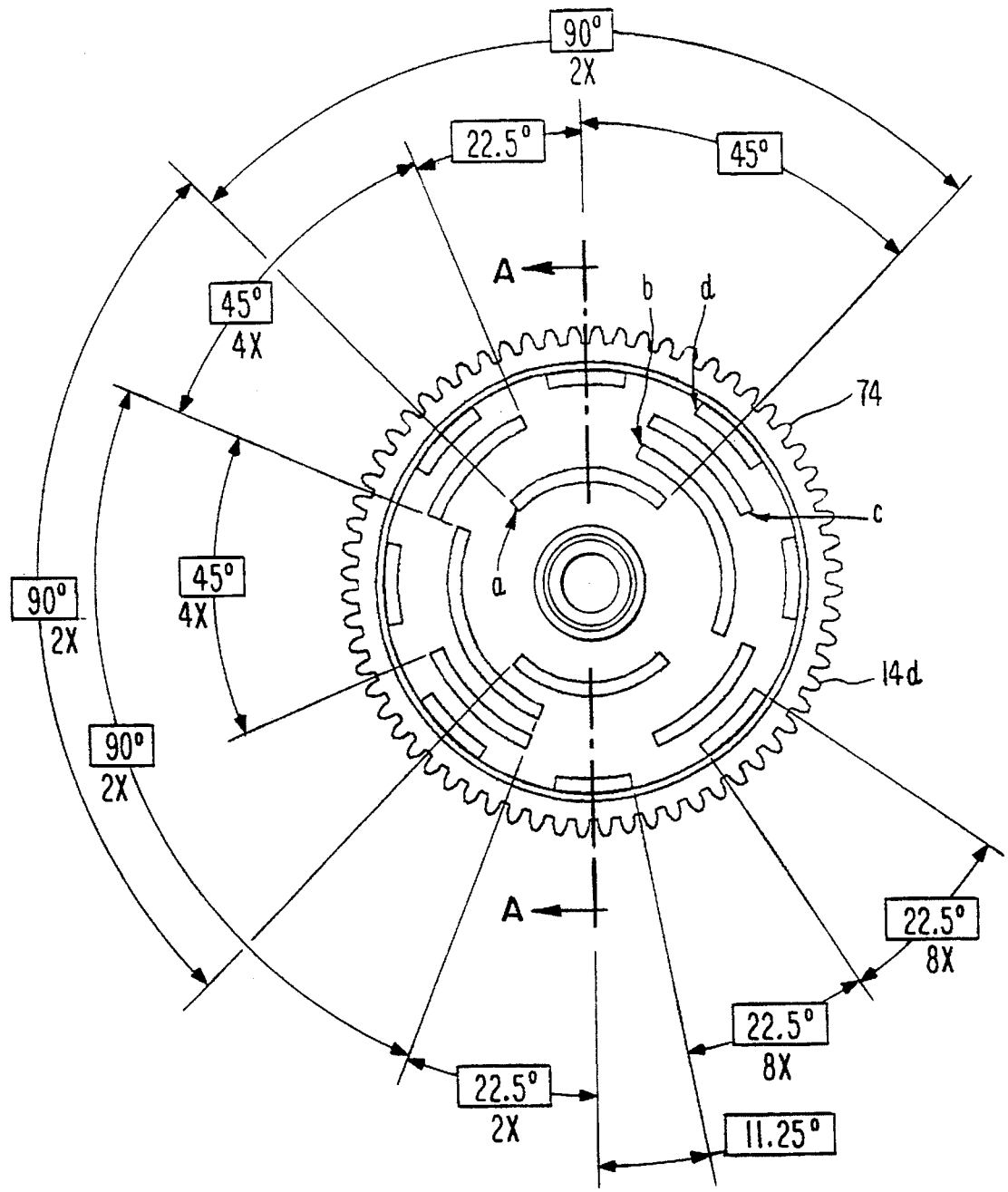
FIG. 25 is a bottom plan view of the fourth encoder wheel of FIG. 23.
Figure 26:
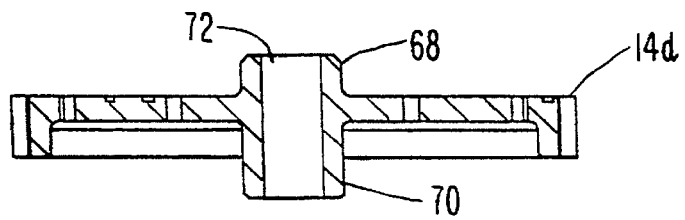
FIG. 26 is a sectional elevational view of the fourth encoder wheel of FIG. 25 taken along the line A—A.
Figure 27:
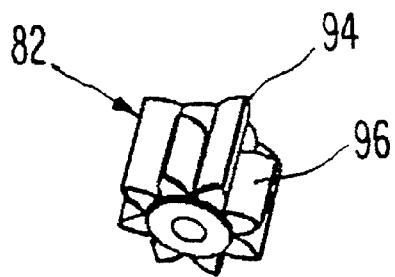
FIGS. 27 and 28 are top plan and bottom plan perspective views of a pinion of FIG. 1.
Figure 28:
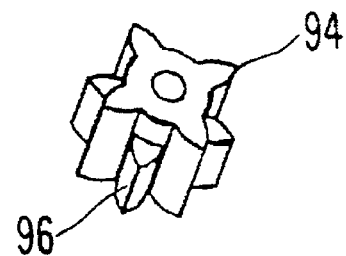
Figure 29:
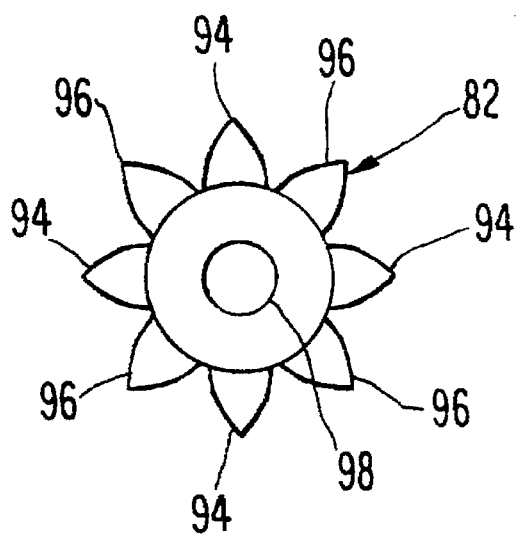
FIG. 29 is a top plan view of the pinion of FIG. 27.
Figure 30:
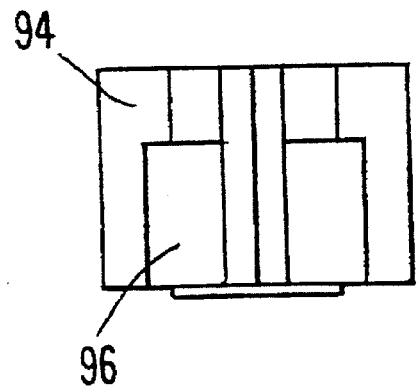
FIG. 30 is an elevational view of the pinion of FIG. 29.

For this purpose recited above, the sensing means 12 of the present invention is specifically adapted to monitor all of the code sequences which will determine the corresponding 16 bit integer value associated with the rotary position. Thereafter, every incremental change in rotary position will correspond with a one bit change in the 16 bit integer value and this will in turn be monitored by the sensing means 12. FIGS. 10, 15, 20 and 25 best illustrate the relationship between each of the respective slots in the four encoder wheels which provide the grey code representation of rotary position. Generally, the first encoder wheel 14a includes a configuration in which the same pattern of slots is provided twice over the wheel, and with the second and third encoder wheels 14b and 14c, the patterns associated with each of these are identical to the other. The attached figures illustrate in greater detail the configuration of the slots comprising the code sequences. The first encoder wheel 14a is illustrated in FIG. 10. The first code sequence is identified by a and is closest to the center. The code sequence a includes two slots which are each approximately 90° in length and spaced at approximately 90° intervals. The second code sequence b includes four slots which are each approximately 45° in length and spaced at approximately 45° intervals. The third code sequence c includes eight slots which are each approximately 22.5° in length and spaced at approximately 22.5° intervals. The fourth code sequence d includes sixty-four slots which are each approximately 1.875° in length and spaced at approximately 3.75° intervals. The second encoder wheel 14b is illustrated in FIG. 15. The first code sequence a as shown includes one slot which is approximately 180° in length. The second code sequence b includes two slots which are each approximately 90° in length and spaced at approximately 90° intervals. The third code sequence c includes four slots which are each approximately 45° in length and spaced at approximately 45° intervals. The fourth code sequence d includes eight slots which are each approximately 22.5° in length and spaced at approximately 22.5° intervals. The third encode wheel 14c is shown in FIG. 20. As indicated above, the pattern associated with the code sequences of the third encoder wheel 14c is the same as that of the second encoder wheel 14b. The fourth encoder wheel 14d is illustrated in FIG. 25. The first code sequence a includes two slots which are each approximately 90° in length and spaced at approximately 90° intervals. The second code sequence b also includes two slots which are each approximately 90° in length and spaced at approximately 90° intervals. The third code sequence c includes four slots which are each approximately 45° in length and spaced at approximately 45° intervals. The fourth code sequence d includes eight slots which are each approximately 22.5° in length and spaced at approximately 22.5° intervals.

As to the manner of monitoring the code sequences by the sensing means 12, this will now be described. Generally, the sensing means 12 provides light illuminated by a light emitting means on one side of the wheel proximate the defined region which is detected by a detector means provided proximate the opposite side of the wheel. In this manner, light illuminated from the light emitting means is identified by the detector means when the encoder wheel is positioned so that a slot is within the defined region. Otherwise, none of the illuminated light will be able to reach the detector means. In this embodiment, preferably the detection of light is represented by a "1" and when no light is detected this is represented by a "0". Also, in the present embodiment, preferably the light emitting means and the detector means are each housed within a tower assembly 102, as best illustrated in FIG. 1. The tower assembly 102 according to this embodiment is comprised of six correspondingly shaped tower members which are mounted to a circuit board 104. Preferably, the tower members are developed according to selection of material and special processing, which will be described below, however, it should be understood that this is not inherently required. As illustrated, each tower member is a generally rectangular member preferably injection molded of thermoplastic or thermosetting materials, such as General Electric resin cycoloy MC1300, and preferably is to be coated with a reflective covering such as bright nickel plating, and includes substantially planar upper and bottom surfaces and also side portions which connect the upper and bottom surfaces. Each tower member also includes a front portion which defines segments of varying lengths extending from a base. Further, at least one aperture, preferably cylindrical, is provided through the upper and/or bottom surfaces proximate the front portion. In this invention, the position of each aperture in a tower member relative to the base is different. For example, in this embodiment, this is accomplished since the aperture is provided proximate the front portion of each segment, and the distance of the front portion of each segment from the base is varied. In the present embodiment, the light emitting means comprises light emitting diodes (LEDs) which illuminate light out through a particular tower aperture and the detector means comprises photo detectors sensing light entering through a particular tower aperture. As illustrated in FIG. 1, the tower members are configured in two columns of three towers and connected with the circuit board 104. Preferably, in this embodiment, the bottom tower in each column includes four apertures only within its upper surface, as illustrated in FIGS. 31-34 at 120, the middle towers in each column including four apertures in both the upper and bottom surfaces, as illustrated in FIGS. 35-38 at 122, and the top towers including four apertures only within its bottom surfaces, as illustrated in FIGS. 39-42 at 124. This particular configuration of apertures allows light illuminated from the LEDs to pass out from the towers onto the defined regions of the code sequences, and when a slot is positioned on a defined region, the light is passed through the slot and through the adjacent tower aperture to the photo transistor. In this exemplary embodiment, preferably the bottom towers 120 include LEDs or photo transistors proximate the apertures in the upper surfaces, the middle towers 122 include photo transistors or LEDs proximate the apertures in the lower surfaces and the upper surfaces, and the top towers 124 include photo transistors or LEDs proximate the apertures in the lower surfaces.

Figure 2B:
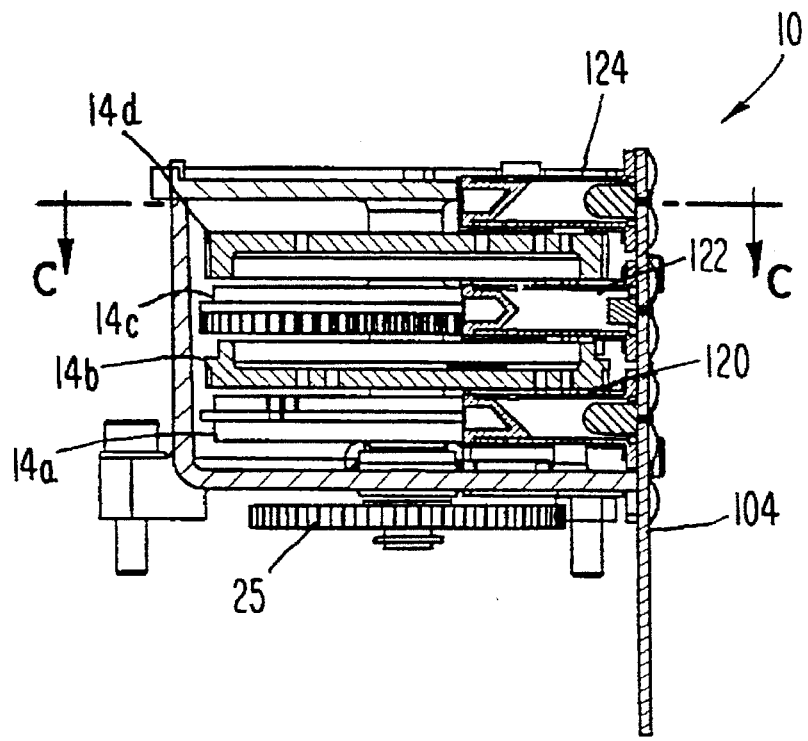
FIG. 2b is a sectional side elevational view of the absolute encoder illustrated in FIG. 1 taken along the line B—B and showing a portion of a tower assembly and encoder wheel assembly.
Figure 2C:
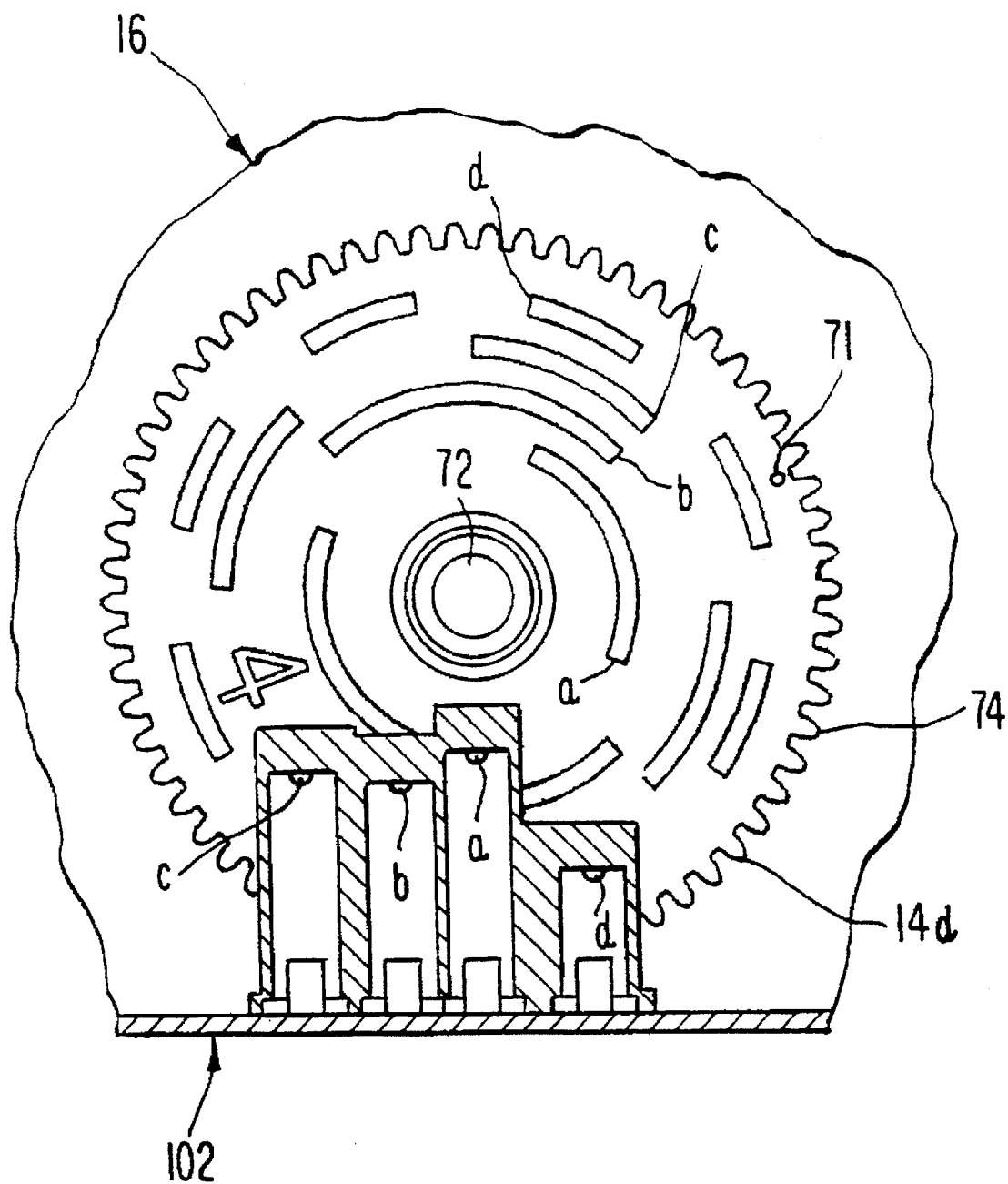
FIG. 2c is a sectional partly cut away top plan view of the absolute encoder illustrated in FIG. 2b taken along the line C—C and showing a top tower of the tower assembly and a fourth encoder wheel of the encoder wheel assembly.
Figure 6:
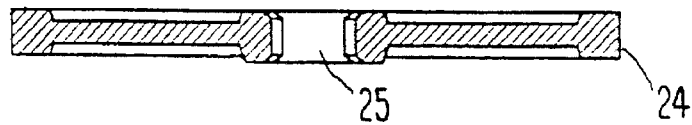
FIG. 6 is a sectional elevational view of the input gear of FIG. 5 taken along the line A—A.
Figure 7:
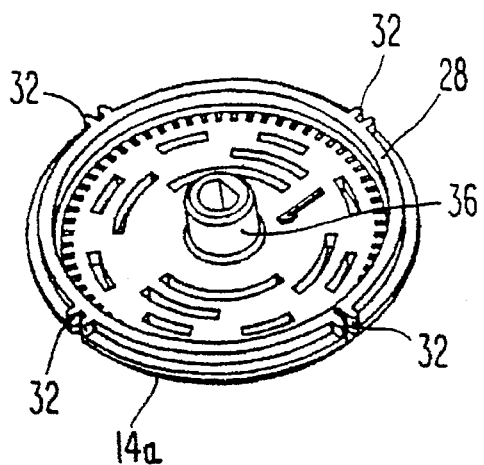
FIGS. 7 and 8 are top plan and bottom plan perspective views of a first encoder wheel of FIG. 1.
Figure 8:
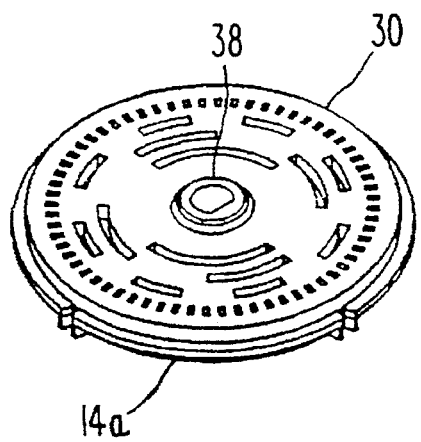
Figure 31:
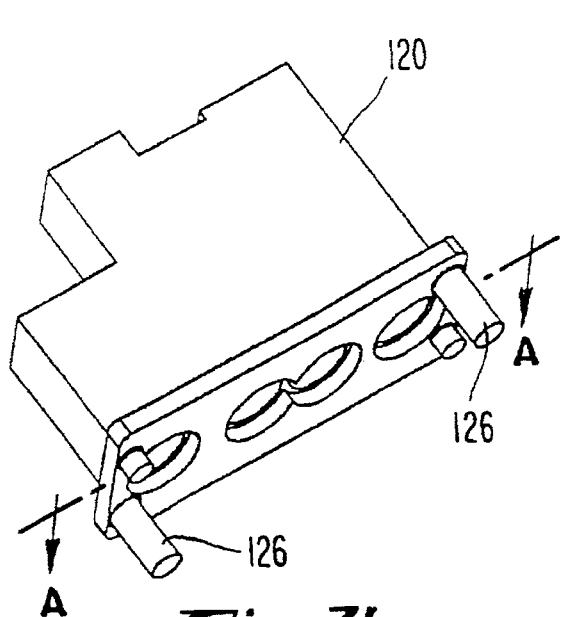
FIGS. 31 and 32 are top plan and bottom plan perspective views of a bottom tower of a tower assembly of FIG. 1.
Figure 32:
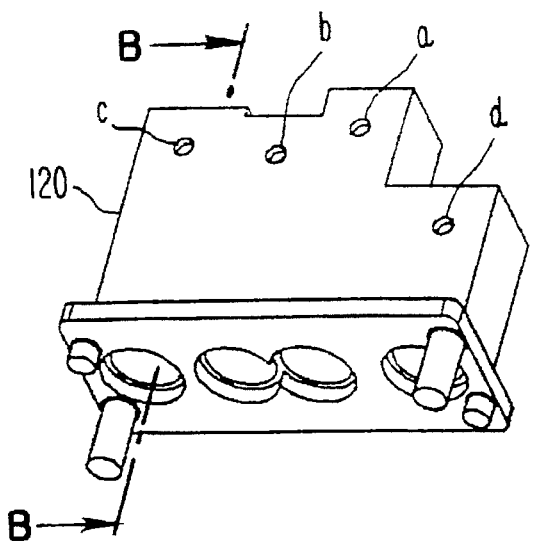
Figure 33:
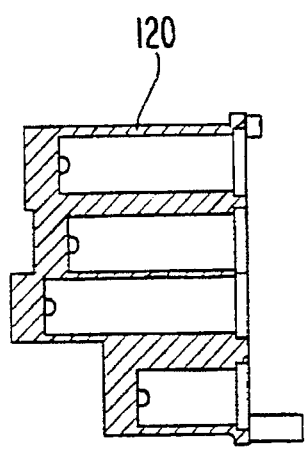
FIG. 33 is a sectional top plan view of the bottom tower of FIG. 31 taken along the line A—A.
Figure 34:
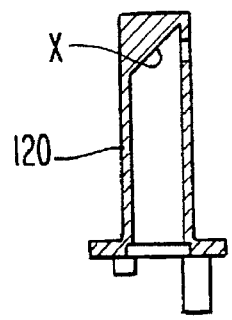
FIG. 34 is a side sectional view of the bottom tower of FIG. 32 taken along the line B—B.

FIGS. 31, 35 and 39 illustrates a view of the base portion of each tower member. As is shown, provided within the base are four substantially cylindrical cavities, and these are configured to receive the LEDs and photo transistors. Also shown are four substantially cylindrical annular bosses which provide the connection with the circuit board 104. FIGS. 33, 34; 37, 38 and 41, 42 illustrate cross-sectional views of the bottom, middle and top towers 120, 122 and 124 respectively, and show the inside portions of these structures. As illustrated, the substantially cylindrical cavities extending into the base are terminated by a taper in a direction of each aperture. In particular, in the top and bottom towers 124 and 120, this is provided as a single taper x, and in the middle tower 122, two tapers x and y are provided which extend from a substantially V-shaped center portion. Preferably, each tapered portion is included with a reflective type of material on its surface in order to reflect the passage of light both out of and into the apertures relative to the LEDs and the phototransistors. Preferably, the tapered portions in the present embodiment are coated with the reflective material, for example electroless nickel plated. Further, as indicated earlier, the annular bosses extending from the base are connected with the circuit board 104. In this embodiment, two of the opposing bosses 126 are generally longer and are adapted for heat staking relative to the circuit board 104. As to the circuit board 104, this contains the electronic circuitry, including the photo transistors and the LEDs of the sensing means 12. The arrangement of the photo transistors and LEDs are illustrated extending from the board 104 in FIG. 1, which are received within the cylindrical cavities within the base portion of each tower member as illustrated in FIG. 2c.

In accordance with the present invention, each encoder wheel is positioned between two tower members and the apertures through each tower member are positioned adjacent a separate code sequence. As illustrated in FIG. 2b in the present embodiment, the second encoder wheel 14b is positioned between the bottom and middle towers 120 and 122, respectively, of the second column, and the fourth encoder wheel 14d is positioned between the middle and upper towers 122 and 124, respectively, of the second column. Similarly, although not shown, the first encoder wheel 14a is positioned between the bottom and middle towers 120, 122 of the first column, and the third encoder wheel 14c is positioned between the middle and upper towers 122, 124 of the first column. In this manner, each of the defined regions of the code sequences are provided between two adjacent towers, and also are proximate the aperture of each tower for monitoring.

In FIGS. 32, 35, 36 and 39 the position of the four apertures in each tower are identified by the letters a–d. As illustrated, in each tower the aperture d is closest to the base, aperture b is further from the base than d, aperture c is further from the base than b, and aperture a is the furthest from the base. As to the relationship between the apertures in each tower with the code sequences of the encoder wheels, as shown in FIG. 2c, the tower apertures a are provided proximate the code sequences a, the tower apertures c are provided proximate the code sequences c, the tower apertures b are provided proximate the code sequences b and the tower apertures d are provided proximate the code sequences d.

Upon assembly of the encoder of the present invention, as shown in FIGS. 1 and 2, the tower assembly 102 is inserted between the respective encoder wheels and the circuit board 104 is fixed to the front of the housing 16, preferably using screws which are placed within apertures in the circuit board 104 which are secured within corresponding apertures in the housing 16. In this arrangement, the connection of the circuit board 104 and housing 16 form a cavity which is sized to enclose the encoder wheel assembly 13. The housing 16 also includes a top panel 19 which is adapted to be connected to both the top portion of the housing 16 and the circuit board 104 for enclosing the mechanism therein. In the present embodiment, the top panel 19 includes apertures therein which are adapted to the "snap-fit" by flexible tab portions provided at the top of the housing 16, although it is noted that other methods for connection can also be used. The top panel 19 as shown includes a generally cylindrical cavity 107 within its inner surface for receiving the annular ring member 68 of the fourth encoder wheel 14d. The inner surface of the top panel 19 also includes a substantially annular ring member 128 extending from its surface which engages the ring member 62 extending from the third encoder wheel 14c.

The operation of the encoder wheel assembly 13 will now be described. Generally, the arrangement of the four encoder wheels provide an intermittent style gearing arrangement. In the present embodiment, the connection between the input gear 24 and drive shaft provide rotation of the four encoder wheels 14a–d. In this arrangement, each incremental change in rotary position of the rotary member corresponds with rotation of the input gear 24 by one tooth, which preferably corresponds to one bit through its connection with the drive shaft. As noted earlier, each incremental change in rotary position corresponds to a single bit change in the 16 bit integer value. In this manner, the rotation of the input gear 24 provides a corresponding amount of rotation of the first encoder wheel 14a by the first shaft 18. In the present embodiment, each 90° rotation of the first encoder wheel 14a corresponds with the rotation of the second encoder wheel 14b by one bit through the engagement of the first encoder wheel teeth 32 and the second encoder wheel teeth 47 with the teeth of the first pinion 82. Similarly, each 180° rotation of the second encoder wheel 14b corresponds with rotation of the third encoder wheel 14c by one bit through the engagement of the second encoder wheel teeth 45 with the third encoder wheel teeth 63 with the second pinion 84. Finally, each 180° rotation of the third encoder wheel 14c corresponds with rotation of the fourth encoder wheel 14d by one bit through engagement of the third encoder wheel teeth 60 and the fourth encoder wheel teeth 74 with the third pinion 86. This foregoing sequence will be the same for either clockwise or counterclockwise rotation of the encoder 10.

As indicated earlier, the sensing means 12 operates by monitoring the position of the encoder wheels via the LEDs and photo transistors. Preferably, in this invention, the sensing means 12 comprises a cmos logic interface which also controls the manner of monitoring of the LEDs and photo transistors during operation of the device. In particular, by regulating the particular sequence of bit sensing accomplished by the LEDs and the photo detectors and also the time in which this occurs. As to the sequence of sensing, as indicated earlier the four encoder wheels provide this information as a sixteen bit integer value and preferably is in grey code. Accordingly, the important aspect here is that each bit which is sensed on the four encoder wheels by the sensing means 12 must maintain a constant position relative to the sixteen bit integer value. For example, the outermost positioned code sequence d in the second encoder wheel 14b correspond to the fifth bit of the sixteen bit integer value. In this embodiment, the order of the sixteen bit integer value preferably begins with the first encoder wheel 14a, with the outermost code sequence d corresponding to the first bit, and ends with the innermost code sequence a of the fourth encoder wheel 14d which comprises the sixteenth bit. It should be understood, however, that any desired order of bit sensing can be utilized for this same purpose.

Figure 43A:
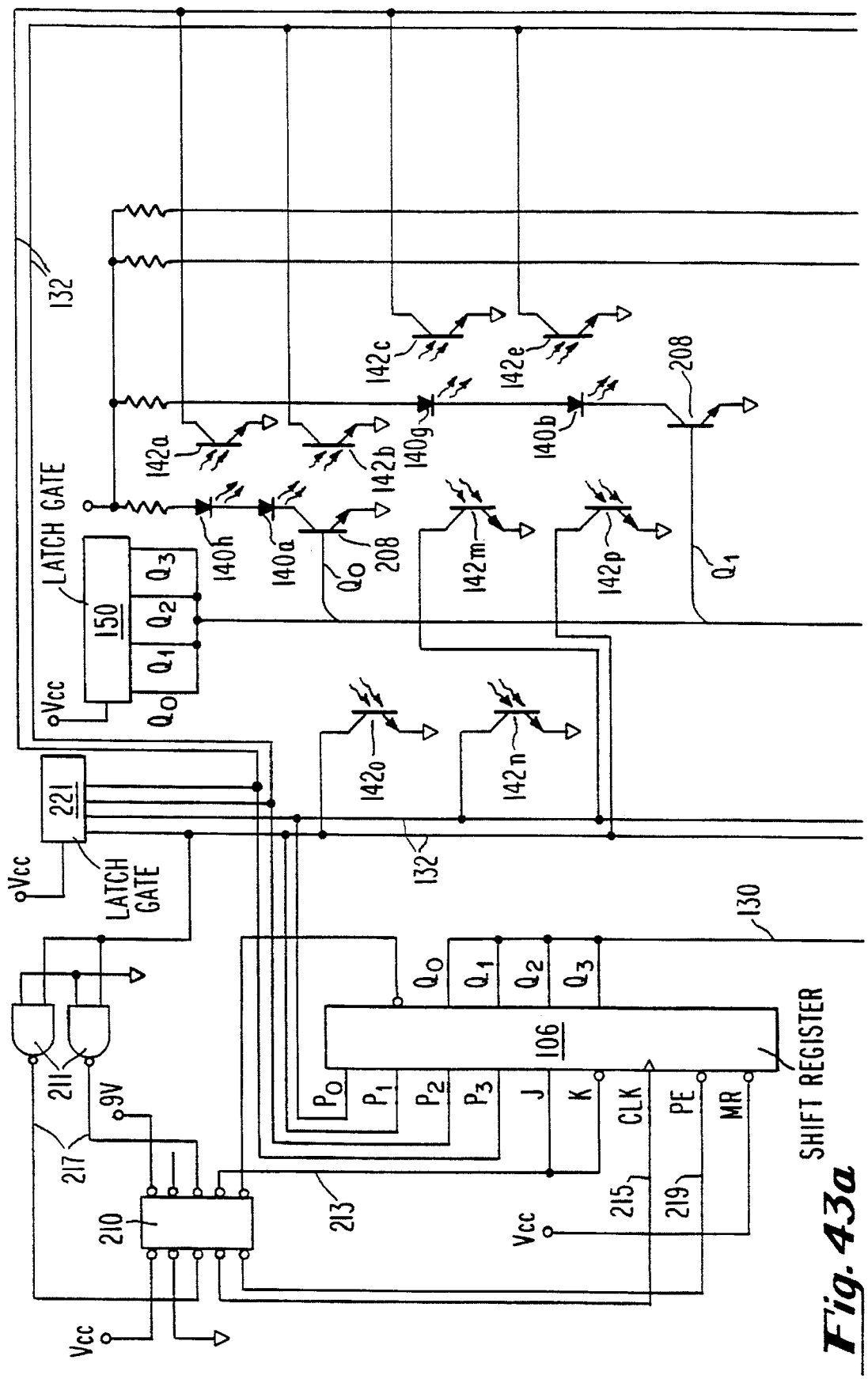
FIG. 43 is a partly schematic partly block diagram illustrating the processing electronics of a sensor of FIG. 1.
Figure 43B:
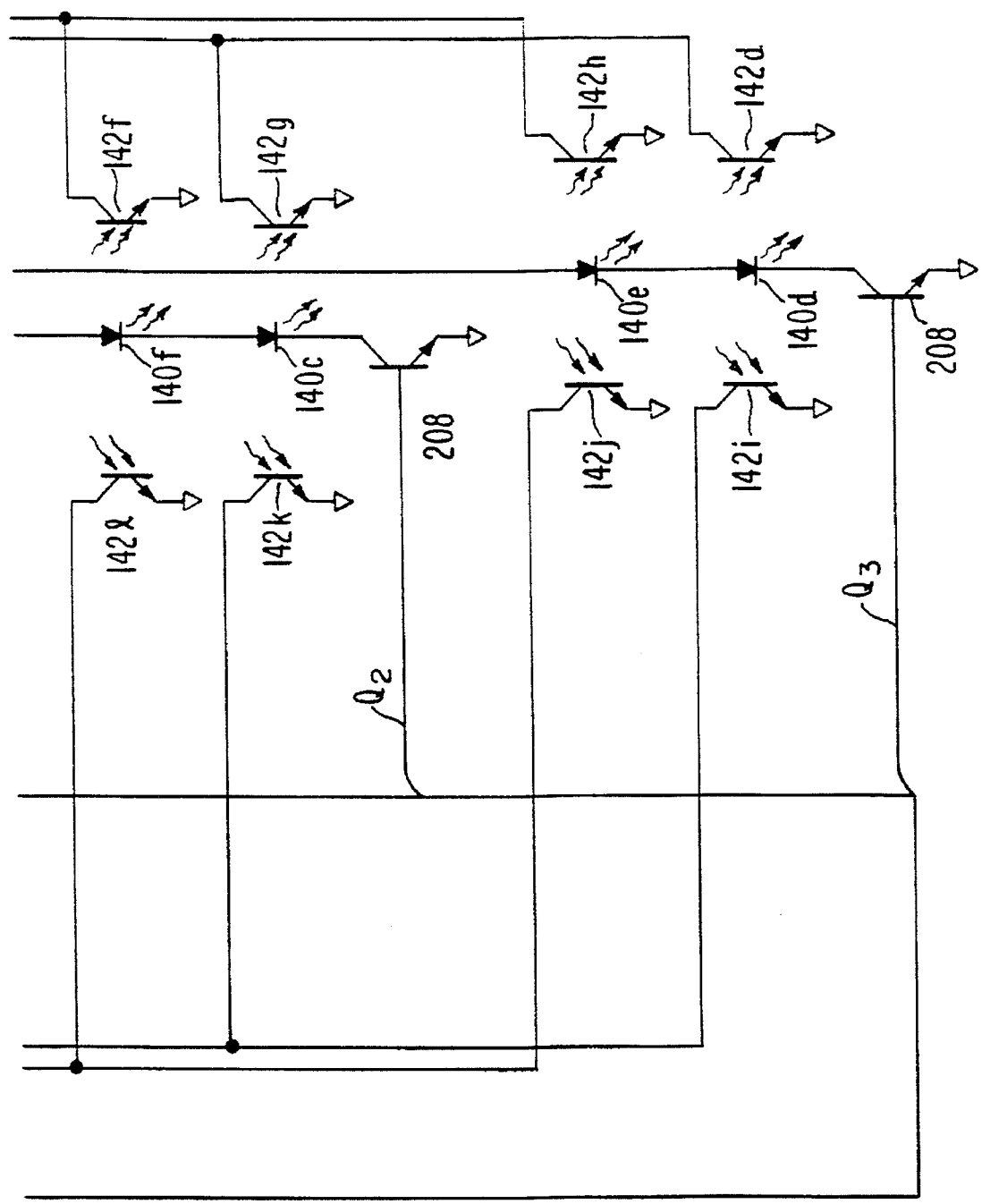

FIG. 43 is a partly schematic partly block diagram which illustrates an exemplary embodiment of the processing electronics of the sensing means 12 according to the present invention. Generally, in this embodiment, conventional LEDs and photo transistors, preferably infrared emitters and detectors are mounted on a conventional printed wiring board which comprises the circuit board 104. Preferably, a shift register 106, for example, a 4-bit universal shift register (75HC195) is included which is provided in connection with the LEDs and the photo transistors by lines 130 and 132, respectively. In the illustrated embodiment, preferably eight LEDs 140 a–h are provided in connection with the shift register 106 as shown which operates to reduce the number of components. However, it should be understood that the number of LEDs can be varied in other applications as well within the spirit of the present invention. Also, preferably 16 photo transistors 142 a–p are provided in connection with the shift register 106 in the manner illustrated. In this arrangement, as illustrated in FIG. 1 of the present embodiment, preferably four LEDs are provided within each of the two middle towers of the tower assembly 102 and four photo transistors are provided within each of the two bottom and top towers of the tower assembly 102. Accordingly, based on this arrangement, in operation of the encoder 10, light is illuminated by the LEDs from the apertures in the upper and bottom surfaces of the middle towers which are detected by the photo transistors through the apertures in the upper and bottom surfaces of the bottom and top towers, respectively.

In addition, in the present embodiment, it is desirable to have the ability to control when various LEDs are driven to their on state in order to limit the power consumption of the system, ease the interface requirements, and also to prolong the ultimate life of the devices. This control is accomplished by utilizing transistors 208 as switches to power pairs of LEDs. Preferably, one each of the LEDs in a particular pair are dedicated to one pair of wheels. Four pairs of LEDs are thus controlled. This configuration ensures that each wheel has a completely determined and controlled LED pattern. As illustrated in FIG. 43, preferably the LEDs 140 a, b, c and d are provided within the first middle tower and 140 e, f, g, h are provided within the second middle tower, the photo transistors 142 b, e, g and d are provided within the first bottom tower and 142 a, c, f and h provided within the second bottom tower and the photo transistors 142 n, p, k, i are provided within the first top tower and 142 o, m, l and j provided within the second top tower. Further, preferably the LEDs 140a and e and photo transistors b, a, n and O are provided proximate the tower apertures a; the LEDs 140 b and f and photo transistors e, c, p and provided proximate tower apertures b; the LEDs c and g and photo transistors g, f, k and l provided proximate the tower apertures c; and LEDs d and h and photo transistors d, h, i and j provided proximate tower apertures d.

In operation, the sensing means 12 preferably determines which LED pairs are driven and also provides the means for transmitting the photodetectors states to a microprocessor 210 in a usable form. The microprocessor 210 is located externally to the encoder, and is interfaced through a cable to the encoder.

For operation, preferably there are two possible modes. The rest mode, which is the most prevalent, is in effect when the encoder wheels are not moving, or moving very slowly which corresponds to when the motor operating the rotary member is not running. Preferably, the position information is provided at this time. During the run mode, additional information about the velocity of the first shaft 18 preferably is also gathered. The microprocessor 210 decides which mode is most appropriate at a given point in time and provides control of the sensing means 12 accordingly.

Preferably, during the rest mode, periodically a logic 1 (high) is serially loaded into the shift register 106. The logic 1 is controlled by the microprocessor 210 and made available on the j and k (inv) lines 213. The microprocessor 210 keeps the serial shift line 219 identified as PE high at this time. When the microprocessor 210 toggles the clock line 215 on the shift register 106, the logic 1 is transmitted to the low bit $Q_0$ and the value of each bit $Q_0$ to $Q_2$ prior to the clock edge is moved up to the next highest bit. Following this operation, the input to j and k (inv) is returned to a logic 0 (low) and subsequent clock edges will move (shift) the logic 1 output into each higher bit, i.e., following the sequence of $Q_0$, $Q_1$, $Q_2$ to $Q_3$. Finally, when the highest bit $Q_3$ contains the logic 1, a new logic 1 may be loaded again from the microprocessor 210 and the process can repeat. The logic 1 output from each bit by the latch gate 150 will switch on the transistor 208 powering an emitter pair. The result is each emitter pair is turned on sequentially by the shift register 106.

The operation just described is made more complex by the need to read the state of the detectors. For this purpose, preferably after each emitter pair is turned on, the state of the four detectors is made known to the microprocessor 210 so the position of the wheels can be determined. This is accomplished by bringing the serial shift line 219 low after the logic 1 is made available to the proper output of the shift register 106. When the serial shift line 219 is low, a rising clock edge will allow a parallel load of whatever states are detected on the input bits $Q_0$, $Q_1$, $Q_2$, $Q_3$ of the shift register 106. That is, the states on the input side of the shift register 106 will now appear on the output bits $P_0$, $P_1$, $P_2$, $P_3$ taking the place of the single logic 1 at the shift register 106 output. This is not a problem since the state of the emitters and detectors are no longer being monitored at this point. The microprocessor 210 monitors the status of the high output bit and immediately sees one state on this clock edge. The serial shift line 219 is returned high and the detector states, by the latch gate 221, are shifted toward the high bit with rising clock pulses. Logic 0 is still the input from the microprocessor 210 on the j and k (inv) lines so a set of lows are following the desired data. After three more clock cycles, all the detector states have been read and j and k (inv) lines receive a logic 1 to excite the next emitter pair. This multiplexing process allows the reduced part count of the emitters.

This process changes when the motor is running. During this mode, preferably speed is more carefully monitored during motor operation, and the least significant bit is read considerably more often than allowed by the scheme just described. In the present embodiment, the code sequence d in each wheel is the least significant bit, however, as it should be understood, this can be varied. During the run mode, the emitter pair relating to the least significant bit is powered continuously and the output of that bit is monitored at all times with a pair of hand gates 200, which are configured as inverters. The outputs of these gates are brought out to the microprocessor 210 over lines 217 for continuous monitoring. Periodically, the position is updated with a read of all devices as in the rest mode. This satisfies the requirement for closer observation during the motor run mode.

The two modes work together to provide all the information needed to the microprocessor 210. Also, since the wheel location uniquely describes the position, preferably, a loss of power is followed by a complete read of all devices as in the rest mode. When the read is complete, the position of the member is known. The remaining components illustrated in FIG. 43 are familiar to those of ordinary skill in the art and are thereby not described in detail for the sake of brevity.

In view of that set forth above, it will be understood that there are several advantages of the present invention. One particular advantage is that the arrangement of the four encoder wheels and three pinions provides an incremental gearing-type of operation which provides improved accuracy; in particular, motion in this configuration cannot stop on the edge of more than one bit. Thus, the error due to transitions is limited to ½ of the magnitude of the least significant bit. In addition, accuracy is further improved since the present invention produces a sixteen bit integer value while also limiting the number of encoder wheels to four. The accuracy is also improved through use of a tower assembly which upon assembly is mounted to be adjacent each code sequence on the four encoder wheels. Another advantage is that the code sequences provided by the four encoder wheels pattern a grey-code configuration, and this provides improved accuracy since only one bit of information changes at any one time, with change in magnitude equal to the least significant bit. Furthermore, this particular operation is the same whether rotation of the shaft would be clockwise or counterclockwise.

Still another advantage of the present invention is that manufacture and assembly can be accomplished easily and at low cost. Specifically, the present invention utilizes many conventional, inexpensive components, such as board mounted LEDs and photo transistors, as well as other conventional electronic components. Furthermore, the encoder wheels, pinions, tower assembly and housing can also be manufactured by conventional techniques and materials, such as by injection molding of plastic. In addition, the present invention provides a code sequence which is comprised of a series of slots formed through the wheels. In addition, another advantage is that the present invention provides an absolute encoder which allows the retention of position data when power is removed; for example, no batteries are required to maintain position information. Further, the position data can be monitored at any time by sensing the position of the code sequences of the encoder wheels.

In view of the foregoing, it will be recognized by those skilled in the art that changes may be made by the above-described embodiments of the invention without departing from the broad inventive concepts thereof. For example, each code sequence described is preferably identified by a series of slots through the four encoder wheels, however the code sequences can also be represented by other means also, such as sections of reflective and non-reflective material either provided on or within the encoder wheels themselves. In addition, the present invention as described above preferably includes a particular arrangement of code sequences which provide a grey code configuration, however other configurations can also be utilized for this same purpose, such as binary code, etc. In addition, while the present invention is shown comprising four encoder wheels and including four code sequences on each wheel, it should be understood that any number of encoder wheels and any number of code sequences on each individual wheel can also be provided without departing from the spirit of the present invention. Similarly, the tower assembly described can also be comprised of any number of tower members for monitoring the encoder wheels. In addition, as to the arrangement of each tower, it should be understood that other types of shapes or configurations are also possible and also that the arrangement of the diodes and photo detectors can be changed, for example in relation to the diode, the light of a diode can be directed out of either the upper or bottom surfaces of each tower, and the same would apply to the photo detectors. It is understood, therefore, that this invention is not limited to the particular embodiments disclosed, but it is intended to cover all modifications which are within the scope and spirit of the invention as defined by the appended claims.

We claim:

1. An absolute encoder comprising: a plurality of rotatably mounted encoder wheels, each encoder wheel including at least one code sequence defining a series of slots through said wheel at spaced separation extending concentrically around the encoder wheel, whereby said plurality of encoder wheels in combination define a plurality of code sequences, wherein said plurality of code sequences comprise a predetermined number of absolute code sequences and at least one incremental code sequence;

attachment means for rotatably connecting said encoder wheels;

sensing means including light emitting means for illuminating a defined region of a predetermined number of said plurality of code sequences of said encoder wheels and detector means for identifying light illuminated by said light emitting means passing through each said encoder wheel when a slot comprises the defined region of said code sequence; and control means for identifying a position of said absolute encoder, wherein said absolute encoder operates in at least first and second modes, said control means communicating with said sensing means for monitoring said defined region of each of said absolute code sequences to identify a position of said absolute encoder when said absolute encoder is operating in said first mode, said control means communicating with said sensing means for monitoring at least during a defined first time interval only said defined region of said at least one incremental code sequence, to identify a position of said absolute encoder when said absolute encoder is operating in said second mode.

2. An absolute encoder of claim 1, wherein the attachment means comprises at least one pinion, with the pinion defining a substantially elongated member having an outer surface including a plurality of teeth at predefined separation extending circumferentially around the outer surface thereof, and each encoder wheel includes a plurality of teeth at predefined separation for engaging said teeth of said pinion.

3. An absolute encoder according to claim 2, wherein said sensing means further includes a plurality of substantially aligned towers for housing said light emitting means and said detector means, each tower defining substantially aligned upper and bottom surfaces at spaced separation, with the upper and bottom surfaces extending from a base to a terminating end defining a cavity, wherein at least one of the upper and bottom surfaces of each tower includes at least one aperture therethrough provided at a distance from said base toward the terminating end, with said light emitting means or said detector means being provided within said tower cavity proximate said base, wherein each encoder wheel is positioned between a pair of towers, with the tower aperture being positioned adjacent the defined region of said code sequence, wherein said terminating end further includes an outer terminating surface and an inner terminating surface, said inner terminating surface having a taper relative to said outer terminating surface, said inner terminating surface further having means for reflecting light through approximately 90°, whereby light entering said tower cavity through said tower aperture is reflected by said reflecting means to be detected by said detector means and light from said light emitting means is reflected by said reflecting means to pass from said tower cavity out through said tower aperture.

4. An absolute encoder according to claim 3, wherein said encoder wheel includes four code sequences extending concentrically around the encoder wheel at space separation and four defined regions corresponding with said four code sequences, with the light emitting means and detector means being associated with each of the defined regions of said code sequences, wherein each tower includes four apertures within at least one of its upper and bottom surfaces.

5. An absolute encoder according to claim 4, wherein said light emitting means comprises a plurality of light emitting diodes for illuminating light through said tower apertures and said detector means comprises a plurality of photo transistors for sensing light entering through said tower apertures.

6. An absolute encoder according to claim 5, wherein said towers are developed according to selection of material and special processing, wherein an infrared reflective coating is applied to said towers, and comprises means of transmitting and confining illuminating light from said plurality of light emitting diodes through said tower apertures to a plurality of said photo transistors in a manner which precludes ambiguity.

7. An absolute encoder according to claim 5, wherein said sensing means includes processing means for actuating the light emitting diodes at defined intervals and storing data identified by the photo transistors.

8. An absolute encoder according to claim 7, wherein said processing means includes a shift register connected with said light emitting diodes and said photo transistors.

9. An absolute encoder according to claim 7, wherein said towers are mounted on a circuit board including said processing means, light emitting diodes and photo transistors.

10. An absolute encoder according to claim 4 further comprising four encoder wheels and three pinions, with the first and third encoder wheels being mounted on a first shaft at spaced separation, and the second and fourth encoder wheels being mounted on a second shaft at spaced separation, the three pinions being mounted on a third shaft with the first pinion being positioned between the first and second encoder wheels, the second pinion being positioned between the second and third encoder wheels, and the third pinion being positioned between the third and fourth encoder wheels, wherein the sensing means further includes six towers arranged in two columns of three towers, with the first encoder wheel being positioned between the first and second towers of the first column, the second encoder wheel being positioned between the first and second towers of the second column, the third encoder wheel being positioned between the second and third towers of the first column, and the fourth encoder wheel being positioned between the second and third towers of the second column.

11. An absolute encoder according to claim 10, wherein said first and fourth encoder wheels have a single row of teeth at predetermined spaced separation and the second and third encoder wheels have two rows of teeth defining upper and lower rows, with the teeth in each of the two rows being provided at predetermined spaced separation, wherein the teeth of said pinion define alternating long and short teeth, with the long teeth extending substantially the entire elongated surface of the pinion and the short teeth extending a distance of the elongated surface less than the long teeth, wherein the short teeth of the pinions are in engagement with the single row of teeth of the first encoder wheel and the upper rows of teeth of the second and third encoder wheels, and wherein the long teeth of the pinions are in engagement with the single row of teeth of the fourth encoder wheel and the lower rows of teeth of the second and third encoder wheels.

12. An absolute encoder according to claim 11, wherein the first encoder wheel is mounted for rotation with the first shaft and the third, second and fourth encoder wheels are mounted for being rotatable relative to the first and second shafts, respectively.

13. An absolute encoder according to claim 11, wherein the defined region of each code sequence comprises one bit, with the defined regions of said 16 code sequences comprising 16 bits, wherein said series of slots defining said 16 code sequences of said four encoder wheels are configured in order to provide a grey code representation defined by said 16 bits.

14. An absolute encoder according to claim 12, wherein said encoder wheels are provided in the housing, with the housing including an inner surface having a boss onto which the second encoder wheel seats, wherein said second and fourth encoder wheels are offset relative to a horizontal axis of said first and third encoder wheels.

15. An absolute encoder of claim 1, wherein when said absolute encoder is operating in said second mode, said control means also communicates with said sensing means for monitoring at least during a defined second time interval said defined region of each of said absolute code sequences, to identify a position of said absolute encoder.

16. An absolute encoder of claim 15, wherein said control means communicates with said sensing means for monitoring sequentially one at a time said defined region of each of said absolute code sequences.

17. An absolute encoder of claim 16, wherein said first mode is a rest mode and said second mode is a run mode, wherein when said absolute encoder is operating in said run mode, said control means communicates with said sensing means for monitoring a greater number of times only said defined region of said at least one incremental code sequence than said defined region of each of said absolute code sequences.

18. An absolute encoder of claim 17, wherein said control means includes light emitter control means communicating with said sensing means for illuminating said defined region of each of said absolute code sequences when said absolute encoder is operating in said first mode, said light emitter control means communicating with said sensing means either for illuminating said defined region of each of said absolute code sequences or for illuminating only said defined region of said at least one incremental code sequence, when said absolute encoder is operating in said second mode, wherein said light emitter control means communicates with said sensing means for illuminating a greater number of times only said defined region of said at least one incremental code sequence than said defined region of each of said absolute code sequences.

19. An absolute encoder of claim 18 further including motor means for controlling operation of said absolute encoder, wherein said motor means comprises at least an on state and an off state, wherein said absolute encoder is in said rest mode when said motor means is in the off state and said absolute encoder is in said run mode when said motor means is in the on state.

20. An absolute encoder of claim 19, wherein said control means detects a pulse count for identifying a position of said absolute encoder when monitoring said defined region of said at least one incremental code sequence when said absolute encoder is in said run mode.

21. A rotary shaft position indicator comprising:

four rotatably mounted encoder wheels, each encoder wheel including at least one code sequence extending concentrically around the encoder wheel, whereby said four encoder wheels in combination define a plurality of code sequences, wherein said plurality of code sequences comprise a predetermined number of absolute code sequences and at least one incremental code sequence;

three pinions, each pinion being provided between two encoder wheels for rotating the second encoder wheel a predetermined amount following a predetermined amount of rotation of the first encoder wheel, whereby a first pinion is between a first encoder wheel and a second encoder wheel, a second pinion is between said second encoder wheel and a third encoder wheel, and a third pinion is between said third encoder wheel and a fourth encoder wheel;

sensing means including light emitting means for illuminating a defined region of a predetermined number of said plurality of code sequences and detector means for identifying light illuminated by said light emitting means, said sensing means further including a plurality of substantially aligned towers for housing said light emitting means and said detector means, each tower defining substantially aligned upper and bottom surfaces at spaced separation, with the upper and bottom surfaces extending from a base to a terminating end defining a cavity into which at least one said light emitting means and said detector means are received, wherein at least one of the upper and bottom surfaces of each tower includes at least one aperture therethrough provided at a distance from said base toward the terminating end for providing a passage for said light emitting means and said detector means, wherein each encoder wheel is positioned between a pair of towers, with the tower aperture being positioned adjacent the defined region of said code sequence; and control means for identifying a position of said rotary shaft position indicator, wherein said rotary shaft position indicator operates in at least first and second modes, said control means communicating with said sensing means for monitoring said defined region of each of said absolute code sequences to identify a position of said rotary shaft position indicator when said rotary shaft position indicator is operating in said first mode, said control means communicating with said sensing means for monitoring at least during a defined first time interval only said defined region of said at least one incremental code sequence, to identify a position of said rotary shaft position indicator when said rotary shaft position indicator is operating in said second mode.

22. A rotary shaft position indicator of claim 21, wherein each said pinion defines a substantially elongated member having an outer surface including a plurality of teeth at predefined separation extending circumferentially around the outer surface thereof, and each encoder wheel includes a plurality of teeth at predefined separation for engaging said teeth of said pinion.

23. A rotary shaft position indicator according to claim 22, wherein said first and fourth encoder wheels have a single row of teeth at predetermined spaced separation and the second and third encoder wheels have two rows of teeth defining upper and lower rows, with the teeth in each of the two rows being provided at predetermined spaced separation, wherein the teeth of said pinion define alternating long and short teeth, with the long teeth extending substantially the entire elongated surface of the pinion and the short teeth extending a distance of the elongated surface less than the long teeth, wherein the short teeth of the pinions are in engagement with the single row of teeth of the first encoder wheel and the upper rows of teeth of the second and third encoder wheels, and wherein the long teeth of the pinions are in engagement with the single row of teeth of the fourth encoder wheel and the lower rows of teeth of the second and third encoder wheels.

24. A rotary shaft position indicator according to claim 21, wherein the first and third encoder wheels are mounted on a first shaft at spaced separation, and the second and fourth encoder wheels are mounted on a second shaft at spaced separation, the three pinions being mounted on a third shaft with the first pinion being positioned between the first and second encoder wheels, the second pinion being positioned between the second and third encoder wheels, and the third pinion being positioned between the third and fourth encoder wheels, wherein the sensing means defines six towers arranged in two columns of three towers, with the first encoder wheel being positioned between the first and second towers of the first column, the second encoder wheel being positioned between the first and second towers of the second column, the third encoder wheel being positioned between the second and third towers of the first column, and the fourth encoder wheel being positioned between the second and third towers of the second column, wherein each encoder wheel includes four code sequences extending concentrically around the encoder wheel at space separation and four defined regions corresponding with said four code sequences, with each of said code sequences defining a series of slots through the encoder wheel, wherein the light emitting means and detector means are associated with each of the defined regions of said code sequences and each tower includes four apertures in at least one of its upper and bottom surfaces.

25. A rotary shaft position indicator according to claim 24, wherein the defined region of each code sequence comprises one bit, with the defined regions of said 16 code sequences comprising 16 bits, wherein said 16 code sequences of said four encoder wheels are configured in order to provide a grey code representation of said rotary shaft position defined by said 16 bits.

26. A rotary shaft position indicator according to claim 24, wherein the first encoder wheel is mounted for rotation with the first shaft and the third, second and fourth encoder wheels are mounted for being rotatable relative to the first and second shafts, respectively, and wherein said encoder wheels are provided in a housing, with the housing including an inner surface having a boss onto which the second encoder wheel seats, wherein said second and fourth encoder wheels are offset relative to a horizontal axis of said first and third encoder wheels.

27. A rotary shaft position indicator according to claim 21, wherein said light emitting means comprises light emitting diodes and said detector means comprises photo transistors, said sensing means further including processing means for actuating the light emitting diodes at defined intervals and storing data identified by the photo transistors, wherein said processing means includes a shift register connected with said light emitting diodes and said photo transistors, and said towers are mounted on a circuit board including said processing means, light emitting diodes and photo transistors.

28. A rotary shaft position indicator of claim 21, wherein when said rotary shaft position indicator is operating in said second mode, said control means also communicates with said sensing means for monitoring at least during a defined second time interval said defined region of each of said absolute code sequences, to identify a position of said rotary shaft position indicator.

29. A rotary shaft position indicator of claim 28, wherein said control means communicates with said sensing means for monitoring sequentially one at a time said defined region of each of said absolute code sequences.

30. A rotary shaft position indicator of claim 29, wherein said first mode is a rest mode and said second mode is a run mode, wherein when said rotary shaft position indicator is operating in said run mode, said control means communicates with said sensing means for monitoring a greater number of times only said defined region of said at least one incremental code sequence than said defined region of each of said absolute code sequences.

31. A rotary shaft position indicator of claim 30, wherein said control means includes light emitter control means communicating with said sensing means for illuminating said defined region of each of said absolute code sequences when said rotary shaft position indicator is operating in said first mode, said light emitter control means communicating with said sensing means either for illuminating said defined region of each of said absolute code sequences or for illuminating only said defined region of said at least one incremental code sequence, when said rotary shaft position indicator is operating in said second mode, wherein said light emitter control means communicates with said sensing means for illuminating a greater number of times only said defined region of said at least one incremental code sequence than said defined region of each of said absolute code sequences.

32. A rotary shaft position indicator of claim 31 further including motor means for controlling operation of said rotary shaft position indicator, wherein said motor means comprises at least an on state and an off state, wherein said rotary shaft position indicator is in said rest mode when said motor means is in the off state and said rotary shaft position indicator is in said run mode when said motor means is in the on state.

33. A rotary shaft position indicator of claim 32, wherein said control means detects a pulse count for identifying a position of said rotary shaft position indicator when monitoring said defined region of said at least one incremental code sequence when said rotary shaft position indicator is in said run mode.

34. A rotary shaft position indicator of claim 33, wherein said plurality of code sequences comprises four absolute code sequences on three encoder wheels and three absolute code sequences with one incremental code sequence on one encoder wheel.

\* \* \* \* \*